(12) United States Patent
Hendrickson et al.

(10) Patent No.: US 12,076,907 B2
(45) Date of Patent: *Sep. 3, 2024

(54) MOLDING SYSTEM AND METHOD FOR MANUFACTURING MODULAR INTERLOCKING ARTICLES

(71) Applicant: Friendship Products LLC, Arlington, VA (US)

(72) Inventors: B. Everett Hendrickson, Los Angeles, CA (US); Timothy Carlson, Arlington, VA (US); Craig Severn, Sharon (CA); Ottmar Brandau, Wasaga Beach (CA); Michael Frederick, Santa Monica, CA (US)

(73) Assignee: Friendship Products, LLC, Arlington, VA (US)

( * ) Notice: Subject to any disclaimer, the term of this patent is extended or adjusted under 35 U.S.C. 154(b) by 154 days.

This patent is subject to a terminal disclaimer.

(21) Appl. No.: 17/374,538

(22) Filed: Jul. 13, 2021

(65) Prior Publication Data

US 2021/0394423 A1    Dec. 23, 2021

Related U.S. Application Data

(62) Division of application No. 14/777,210, filed as application No. PCT/US2014/030905 on Mar. 17, 2014, now abandoned.

(Continued)

(51) Int. Cl.
*B29C 49/54* (2006.01)
*B29B 11/14* (2006.01)
(Continued)

(52) U.S. Cl.
CPC .............. *B29C 49/54* (2013.01); *B29C 33/42* (2013.01); *B29C 33/44* (2013.01);
(Continued)

(58) Field of Classification Search
CPC ................ B29C 49/54; B29C 49/4802; B29C 2049/4882; B29C 2049/4887
See application file for complete search history.

(56) References Cited

U.S. PATENT DOCUMENTS

| 6,045,746 A * | 4/2000 | Komine ................. B29C 49/54 |
| | | 425/529 |
| 2007/0098935 A1* | 5/2007 | Farran ..................... B29C 49/54 |
| | | 264/318 |
| 2008/0044603 A1* | 2/2008 | Hutchinson ............ B29C 51/04 |
| | | 264/325 |

FOREIGN PATENT DOCUMENTS

| EP | 1510325 A1 * | 3/2005 | ............ B29C 49/18 |
| WO | WO-03055756 A1 * | 7/2003 | ......... B65D 21/0204 |

(Continued)

*Primary Examiner* — Michael A Tolin
*Assistant Examiner* — Hana C Page
(74) *Attorney, Agent, or Firm* — ROONEY IP, LLC

(57) ABSTRACT

Described are a mold and molding process for manufacturing devices and containers that are scalable, modular, and lockable laterally and vertically with other like devices or containers. The mold is formed with a cup mold and top end mold sections specially designed to allow for molding and demolding a container with an undercut. The cup mold includes, on a vertical wall, one or more undercuts. Multiple undercuts may further form tongues with undercuts each of which forms a groove with undercuts on the molded article, and/or one or more grooves with undercuts each of which form a tongue with undercuts in the molded article. Molding and Demolding of the article with undercuts is further enabled by utilizing an improved method of molding said article with an undercut, and demolding said article from the mold once it is molded, by improvements to each stage of the molding process, including the preform stage, the conditioning station stage, the blow stage and the release stage.

5 Claims, 24 Drawing Sheets

Related U.S. Application Data

(60) Provisional application No. 61/852,044, filed on Mar. 15, 2013.

(51) Int. Cl.

| | |
|---|---|
| *B29C 33/30* | (2006.01) |
| *B29C 33/42* | (2006.01) |
| *B29C 33/44* | (2006.01) |
| *B29C 33/48* | (2006.01) |
| *B29C 49/06* | (2006.01) |
| *B29C 49/12* | (2006.01) |
| *B29C 49/48* | (2006.01) |
| *B29C 49/64* | (2006.01) |
| *B29C 49/70* | (2006.01) |
| *B65D 1/02* | (2006.01) |
| *B65D 1/40* | (2006.01) |
| *B65D 21/02* | (2006.01) |
| *B29K 67/00* | (2006.01) |
| *B29K 105/00* | (2006.01) |
| *B29L 31/00* | (2006.01) |

(52) U.S. Cl.
CPC ........ *B29C 49/4802* (2013.01); *B29C 49/541* (2013.01); *B29C 49/70* (2013.01); *B65D 1/0223* (2013.01); *B65D 1/40* (2013.01); *B65D 21/0204* (2013.01); *B29B 11/14* (2013.01); *B29C 33/30* (2013.01); *B29C 33/48* (2013.01); *B29C 49/06* (2013.01); *B29C 49/12* (2013.01); *B29C 2049/4882* (2013.01); *B29C 2049/4887* (2013.01); *B29C 2049/4894* (2013.01); *B29C 2049/543* (2013.01); *B29C 2049/546* (2013.01); *B29C 49/6427* (2013.01); *B29C 49/6463* (2013.01); *B29C 2949/0723* (2022.05); *B29C 2949/0724* (2022.05); *B29C 2949/078* (2022.05); *B29C 2949/20* (2022.05); *B29K 2067/003* (2013.01); *B29K 2105/258* (2013.01); *B29L 2031/7158* (2013.01); *B29L 2031/727* (2013.01)

(56) References Cited

FOREIGN PATENT DOCUMENTS

| WO | WO-2011022578 A2 * | 2/2011 | ......... B65D 21/0204 |
|---|---|---|---|
| WO | WO-2012045061 A2 * | 4/2012 | ............ B29C 49/06 |

\* cited by examiner

MOLDING SYSTEM AND METHOD FOR MANUFACTURING MODULAR INTERLOCKING ARTICLES

CROSS REFERENCE TO RELATED APPLICATIONS

This application is a divisional of U.S. patent application Ser. No. 14/777,210 filed Sep. 15, 2015 (pending), which is a 371 of PCT Patent Application Serial No. PCT/US2014/030905 filed Mar. 17, 2014 (expired), which claims the benefit of U.S Provisional Patent Application Ser. No. 61/852,044 filed Mar. 15, 2013, the disclosures of which are incorporated by reference herein in their entirety.

FIELD OF THE INVENTION

The present invention relates to a process, device, and apparatus for molding a plastic article such as a bottle or container using blow molding techniques.

BACKGROUND

The present invention and its embodiments relate to containers that are scalable, modular, and lockable laterally and vertically with other like containers. Various embodiments of such scalable, modular, interlocking containers are provided for a variety of applications. One use of an interlocking container of the present invention is as a vessel for storing and/or transporting flowable materials such as liquids, pourable solids, and other such small granular materials that are relatively easy to empty via pouring. Another use of the interlocking containers is as a sturdy, modular, low cost, easily-assembled building material of a standardized nature. They may also be used as bottles or cans for transporting and drinking water and other liquids. The containers themselves could be recycled as building materials to construct basic structures and shelters such as for international relief and development efforts, and/or structures and shelter for military applications. A further use is attendant to the disassembly of structures (walled and otherwise) built from the containers, such as disassembly for purposes of relocating and/or reconfiguring the units as needs change. Embodiments of reduced sized have other uses, such as for a modeling agent or modeling toy or furniture elements.

Blow molding is a well-known technique that is used for manufacturing plastic articles such as bottles, containers, automobile parts, or cases. In a one-stage or "single-stage" blow molding machine, the process begins with manufacture at a first station of a hot, injection molded preform or "parison" of hollow plastic material, the preform further conditioned at a second station and then moved and positioned at a third station which has a mold cavity with interior walls in the shape of the final article to be molded. In a "two-stage" machine the preforms are manufactured externally, but transported to and reheated at a conditioning station before moving to the blow cavity.

Injection stretch blow molding (ISBM) is a term of art and refers mostly, if not entirely, to biaxial PET blow molding from preforms. ISBM techniques date back only about 35 years. Other sorts of blow-molded plastic bottles are blown not from a test-tube shaped preform of the type these embodiments use, but rather start from an extruded tube that the closing mold pinches off at the bottom end. ISBM is used to provide a plastic container or other useful article of manufacture created on a machine from a pre-form, which is first stretched in the axial direction, and then blown in a mold by high pressure air in the hoop direction. The hot preform may be manufactured via an injection mold station on a "one-stage" or "single-stage" stretch blow mold machine, whereafter the preform is temperature conditioned, then stretch blow molded into a final article, and finally cooled on the same machine before ejection.

Materials used in blow molding to create plastic articles include polyethylene (PE) and polyethylene terephthalate (PET), due to their high level of thermoplasticity.

The essential sequence of operations in a single-stage ISBM machine is as follows. PET is delivered to the machine site, usually in small flake form contained in sizeable boxes ("gaylords"). Once the gaylord box is opened, the PET particles immediately begin absorbing excessive levels of moisture from the ambient air. Thus, virtually all single-stage ISBM machines run the PET material though a dryer. The material then enters a "manifold" meant to maintain PET heat and dryness during transport to the preform molding station, where the parison is formed by injecting liquefied PET material into a mold cavity, with parison thickness and its internal profile a function of the shape of the perform insertion rod lathed to specifications. Once cooling enough to transport, the molded perform moves to a conditioning station, where optimal (bottle specific) pre-blow temperatures are achieved for the parison, both internally and on its exterior surface. The conditioned parison then moves to the blow station, where compressed air works with a stretch rod to expand the PET resin until contact with the mold cavity walls, at which point the PET resin quickly cools and hardens, after which the mold pieces open and retract to allow bottle ejection.

SUMMARY

The preferred and alternative embodiments of the present invention provide an improved mold assembly that can be used to manufacture large quantities of modular, interconnecting articles, such as bottles, with unique interlocking features.

In the present case, the design and manufacturing objective is to create a modular multi-use bottle that interlocks both horizontally (via a series of tongues and grooves along the vessel sides, engaging via a vertical sliding motion) and vertically (via a bottom recession of nearly identical shape to the bottle top assembly, receiving such top assembly in a snug fit).

Another consideration is to allow smooth decanting of the contained material, without pockets of material caught in corners and other tight spots.

A further consideration is to allow and plan for different bottle capacities with full interlocking between such sizes.

Because PET plastic is tough, lightweight, durable and transparent, it is a preferred material for bottles industrywide, and the preferred material in the applications here, all the more because of its high amenability for recycling. Nonetheless, it is also desirable to achieve and maintain the ability to produce, where possible, interlocking bottles from a broader range of recyclable materials. However, PET bottles are normally created with an ISBM approach and thus on a machine capable of performing ISBM.

Because high volume and geographically disperse production at minimal per-unit cost are vital considerations, it is desirable to be able to employ commonly available blow molding machines, albeit with certain necessary adaptations and adjustments.

All uses also greatly benefit the environment by reducing the waste stream through recycling. The environmental problems created by solid waste in general and plastic containers in particular are well known. The U.S. Environmental Protection Agency reported that from 1980 to 2005, the volume of municipal solid waste increased 60% resulting in 246 million tons generated in 2005 in the United States. The present technique provides an incentive to re-use containers not only for similar uses (such as to hold materials) but also for other applications (e.g., as creative modeling or play elements or building blocks for useful structures such as shelter construction). For example, certain embodiments of containers and bottles containing solid and liquid foodstuffs or other goods are recycled into use as construction materials, thereby reducing solid waste. A common alternative is to recycle containers by collecting, sorting and reprocessing them. Another alternative is to reuse the containers for their original purpose for which they were purchased instead of recycling them.

The embodiments of consumer-sized containers could also increase the potential for recycling into other uses, which could reduce the two million tons of trash in the United States generated from throwing away plastic water bottles. Containers made of plastic or other packaging materials account for another very large portion of the trash stream. The increased likelihood that consumers will "mass" these interlockable containers after their original use makes it considerably more likely that the containers will be recycled in similar high proportion once their secondary use has terminated, a pattern that promises to improve end-stage recycling rates markedly.

The embodiments of the smaller consumer-sized containers or bottles also increase the potential for recycling into other uses, in turn reducing a large portion of solid waste presently generated from discarding plastic beverage bottles and the like. The larger embodiments also have humanitarian purposes. Resulting simple-walled structures are easily amenable to local/traditional roofing solutions or to emergency relief roofing techniques and materials. As for yet other important efficiencies, the various embodiments of the exemplary containers allow cost-effective, energy-effective and materials-effective molding by eliminating unnecessary details.

Efficient transportation of bulk quantities of containers for any purpose can be challenging. Typically, efficient packing and transport of containers are helped by avoiding odd shapes and by eliminating or at least significantly reducing damage caused by unnecessary protrusions. The exemplary containers include such advantages and additionally are scalable to conform to shipping standards, including common dimensions of pallets and containers.

Perfect or near perfect scalability of containers allows for the manufacture of sizes and volumes regularly used in relevant industries, including prominently in the international delivery of relief and development field, but also for other practical and/or hobbyist uses, including in sizes amenable to hold beverages and other consumer goods. Embodiments include re-usable containers appropriate for use in all geographic regions. Among the benefits is ease of assembly by strength-challenged disaster victims and/or by persons without building experience. No or limited mortar, rebar or any other connective addition is needed, and despite no or limited mortar or reinforcing elements, resulting structures can withstand stress forces such as high winds and earthquakes.

FIGURES

The accompanying figures, where like reference numerals refer to identical or functionally similar elements throughout the separate views and which together with the detailed description below are incorporated in and form part of the specification, serve to further illustrate various embodiments and to explain various principles and advantages:

DETAILED DESCRIPTION OF THE EMBODIMENTS

Figure 1:
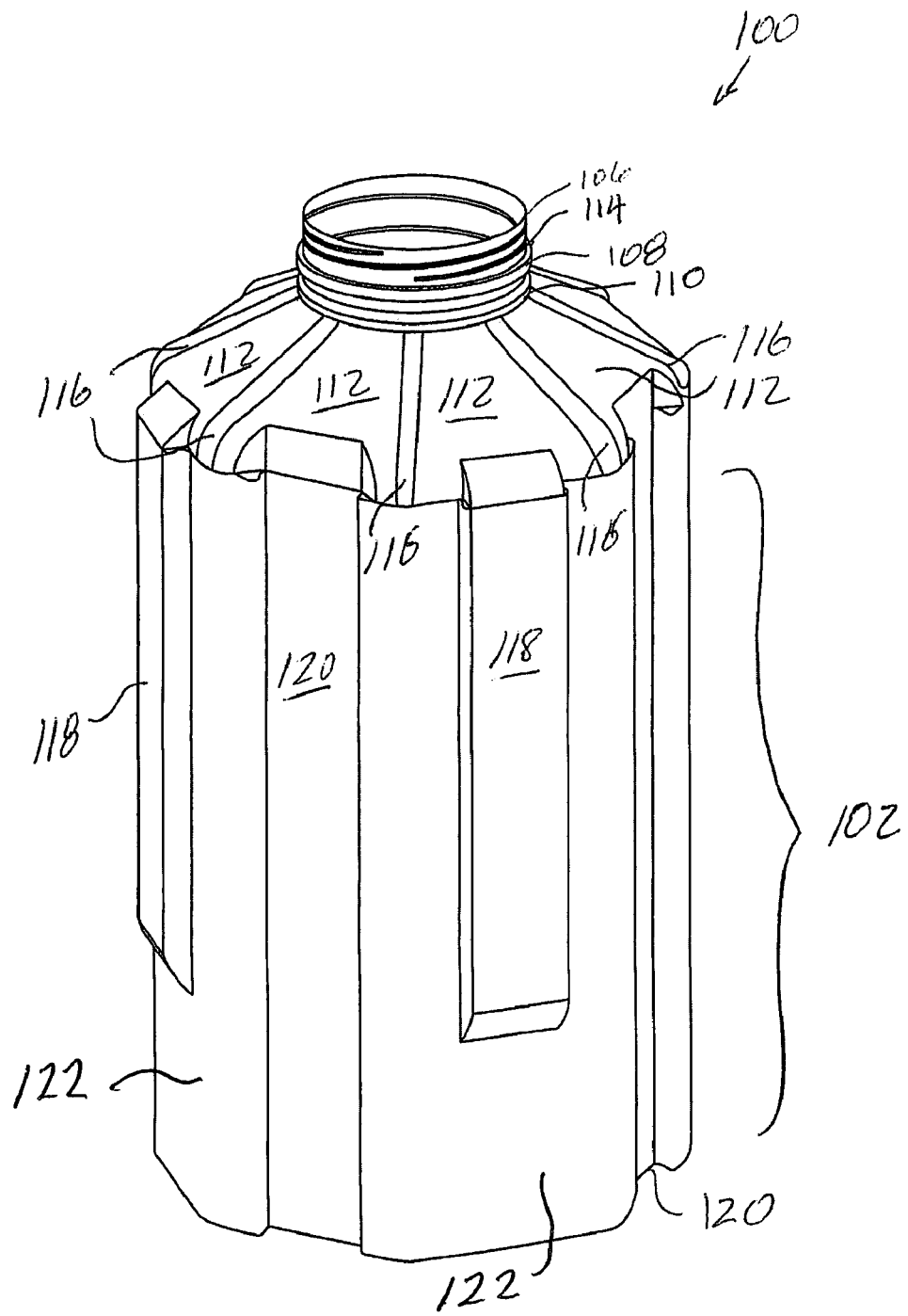
FIG. 1 is an embodiment for an octagonal-shaped modular interlocking container.

Before describing embodiments in detail, it should be noted that the embodiments reside largely in apparatus components and/or method steps a related to various embodiments for a mold that is part of a stretch blow molding device that can manufacture scalable, modular, or interlocking containers or articles with follow-on utility. Accordingly, the apparatus components and/or method steps have been represented where appropriate by conventional symbols in the drawings, showing only those specific details that are pertinent to understanding the embodiments so as not to obscure the disclosure with details that will be readily apparent to those of ordinary skill in the art having the benefit of the description herein. While in the illustrated embodiments the mold apparatus is described for use in a stretch blow molding machine, it will be understood by those skilled in the art that the apparatus embodying the invention could be used in other molding or die casting applications, including but not limited to extrusion blow molding, injection molding, or tumble molding.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The embodiments of the invention include a scalable, modular, interconnective, and interlocking container with multi-purpose uses and applications. An exemplary first use is for transporting and/or storing flowable materials such as liquids or pourable solids. An exemplary second use is for a creative modeling element or for a sturdy, low cost, easily assembled building block material of a standardized nature. The embodiments can be used for building housing, storage, or other practical structures, including prominently (but not limited to) applications employed for disaster relief, humanitarian development projects, for military or defense purposes, and for other practical and modeling purposes. The embodiments include a single unit that is interlocked to other modular units of the same or different sizes. Each modular unit slide-locks with other units to form strong wall and building structures that can be filled with liquids such as water, natural earth, sand, or other natural or processed materials, thereby forming a sturdy structure without need of mortar, and can adapt to uneven base surfaces typically found in natural terrain.

Figure 2:
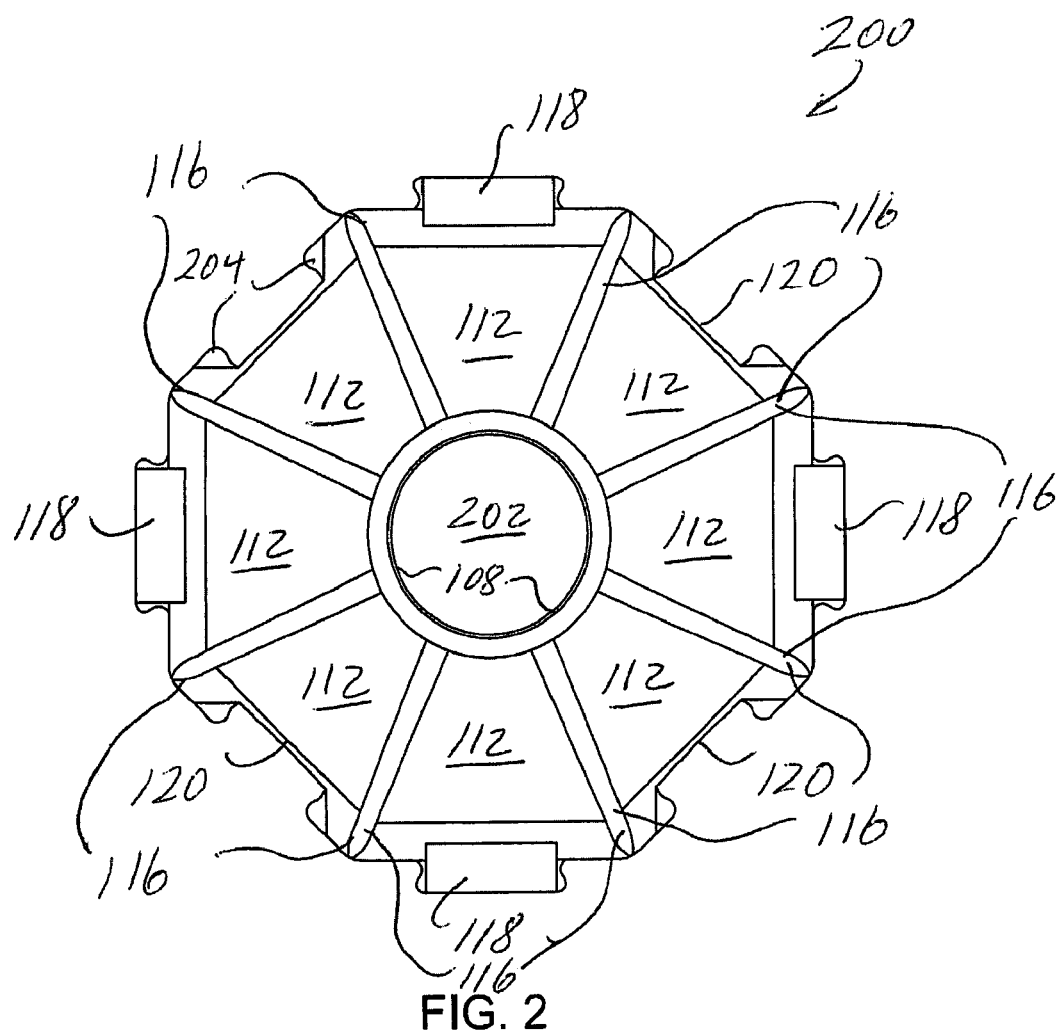
FIG. 2 is plan view of the top portion of the embodiment for the octagonal-shaped interlocking container illustrated in FIG. 1.
Figure 3:
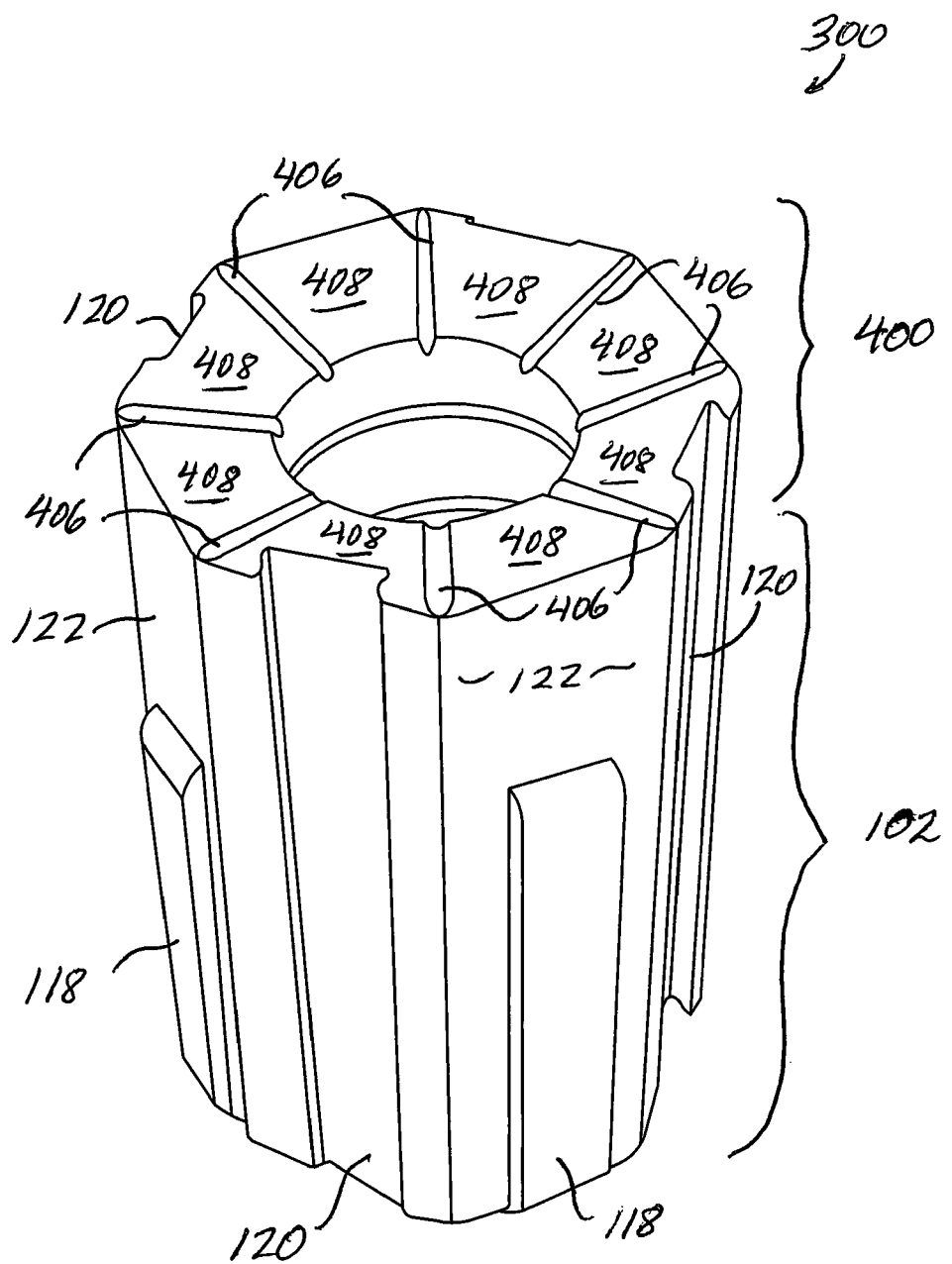
FIG. 3 is a perspective view of the bottom portion of the octagonal-shaped interlocking container illustrated in FIG. 1.
Figure 4:
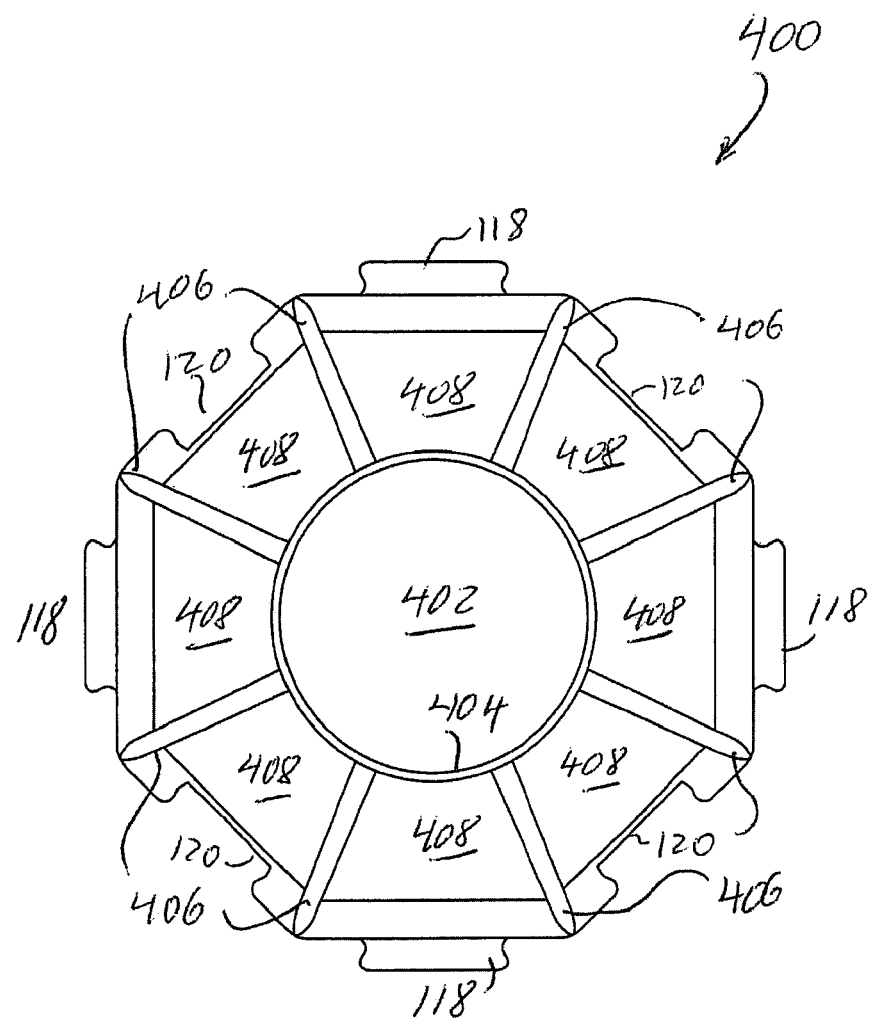
FIG. 4 is a plan view of the bottom portion of the embodiment for the octagonal-shaped interlocking container illustrated in FIG. 1.

Embodiments of a scalable, modular interconnecting container are described in relation to the drawings in the figures. FIG. 1 illustrates a perspective view of upright container 100 and FIG. 2 illustrates a plan view of the top portion of container 100, referred to herein as the top end assembly portion or section 200. FIG. 3 shows a perspective view of an inverted container 100, and FIG. 4 illustrates a plan view of the bottom of container 100, referred to herein as a bottom end assembly portion or section 400. Container 100 is a hollow or partially hollow element that may be constructed of plastic, metal, resin, or composites. For example, in certain embodiments, container 100 is made of PET or other thermoplastic material. As one skilled in the art will recognize, container 100 could be constructed of any rigid material that is appropriately high-strength and could provide sufficient stackable and connectable rigidity. Container 100 may be formed wall having any number of upright sides in a geometric cross-sectional pattern or could be formed with a single, cylindrical wall. Container 100 is intended to hold liquids, solids, or gasses but could also be useful as a modeling or building element without holding any internal materials.

In the embodiment illustrated in FIG. 1, container 100 is shown with eight longitudinal walls 102 of equal or varying height which form a generally octagonal latitudinal cross-section. The embodiments are not limited, however to an octagonal cross-section and could be formed with circular, triangular, square, rectangular, or hexagonal shapes, for example. One skilled in the art will recognize that the shape of the container 100 could be a design construction of any polygon, circle or oval, and could have different heights, diameters or cross-sectional areas, or openings while still forming a container. It should be noted that, in certain embodiments, the design construction is that of a regular polygon.

An exemplary height-to-width ratio of the container 100 is described so as to accommodate certain manufacturing aspects, but also so as to result in a center of gravity of each modular container low enough to impart stability for stacking, shipping, handling, and other such purposes. In certain embodiments, the height-to-width ratio of the container 100 is approximately 2:1. However, the invention is not limited to this ratio, and one skilled in the art will recognize that other embodiments will demonstrate that other ratios are useful and possible. Various volumes of container 100 are also possible, for example, 250 mL, 375 mL, 500 mL, IL, 2 L or 5 L. While container 100 could be manufactured with varying diameters or footprint, in a preferred embodiment containers 100 with varying volumes maintain the same diameter or footprint in order to facilitate consistent vertical interconnectivity.

In FIG. 2, top end assembly section 200 provides an opening 202 formed by neck 106 for filling container 100 with any gas, fluid, granular, flake or other solid material. A neck 106 with threads 114 is shown over the opening 202, which can optionally be manufactured with an airtight or pressure-resistant seal or cap (not shown) to maintain contents within container 100. Neck 106 connects with a cap via threads, a snap on mechanism, or any type of connection that could form an appropriate seal to hold container contents. With an appropriate seal formed on neck 106, container 100 may be made water-tight for holding and transporting liquids (e.g., water, juice, cooking oil), or could form an appropriate seal for granulated or powdered goods (e.g., grains, seeds, flour, flakes), household materials (e.g., soap, cleaners), or construction materials (e.g., cement, grout, sand). A ring 108 is formed near the base of neck 106. It should be noted that ring 108 may also function as a seat for a tamper evident ring that may be included between neck base 110 and threads 114 wherever necessary.

Top end assembly 200 is formed with slope sections 112 that rise from each top-edge of upright walls 102 and meet neck 104 at the apex of the slope. An advantage of an angled rise in each slope section 112 is that it provides for smoother pouring of contents when the container is inverted and assists with complete liquid or granular refilling of container 100, when desired. In the exemplary embodiment, ridges or spines 116 are formed on or within top 200 at intersections of each slope section 112 and extend from neck base 110 to a vertex of a wall 102. Ridges 116 may be distributed radially and equidistant from one another or in other configurations formed partially or fully on top end assembly 200 according to user preference or as manufacturing process necessitates. In other embodiments, ridges may be substituted with pegs or knobs on slope sections 112. Ridges 116 also provide additional compressive strength and stability for the vertical interlocking of stacked containers, which in turn provides better utility for alignment, packing, transport, construction and modeling purposes. When stacking containers, ridges 116 should fit into corresponding channels formed in the bottom of a container placed vertically on top of container 100. This is explained in more detail in FIGS. 7 and 8 and the corresponding description.

Referring to FIGS. 3 and 4, perspective and plan views are shown of container 100 in an inverted orientation, thus detailing an isometric bottom end view 300 of the container 100. Bottom end assembly section 400 is connected to wall 102 distal to top end 200 and shaped in a cross-sectional form similar to that of top end assembly 200, i.e. circular, oval or polygonal, such that walls 102 connect each end of 408 to create the enclosed container vessel 100. Bottom end assembly section 400 comprises one or a plurality of elongated indents or channels 406 that are indented as grooves and distributed radially between around bottom sections 408. Bottom channels 406 extend a length of either partial or full distance from the wall 102 edge to an edge of vertical interconnection bottom receptor 402. Channels 406 are preferably oriented and arranged to receive like-sized ridges 116 from a top end section of a similarly constructed separate container 100. Together, ridges 116 and the channels 406 also provide for faster and proper alignment when stacking one container 100 upon another vertically via a "click-feel" type of fit. A small fit tolerance between top assembly 200 and bottom end assembly 400 is designed so as to create snugness, thereby limiting side-to-side "rocking" and minimizing wasted container capacity. It should be noted that, in certain embodiments, the position of ridges 116 and channels 406 can be swapped, i.e., the channels 406 indented into top assembly 200 and ridges 116 formed on bottom assembly 400. In alternative embodiments, channels 406 are arranged in different patterns or substituted with circular or geometrically-shaped pegs and indents which are arranged to fit one another with the "click-feel" type of connections.

Vertical interconnection receptor 402 is formed as an indent into the bottom end assembly 400 of the container with a diameter large enough to receive a closure cap and ring 108 from a similar container 100. Receptor 402 may optionally have a limiting edge 404 with a diameter small enough to operate as a stop against ring 108 during vertical interconnection with a similar container 100. The interlocking nature of ridges 116 on a first container to channels 406 on a second separate container, and neck 106 with an optional cap on a first container to receptor 402 on a second container promote stable alignment of certain elements of horizontally connected and vertically stacked containers. In some embodiments, the surfaces of top assembly 200 and bottom assembly 400 are slightly coarse or rough to provide additional friction for connectivity and stability during vertical stacking.

Figure 5:
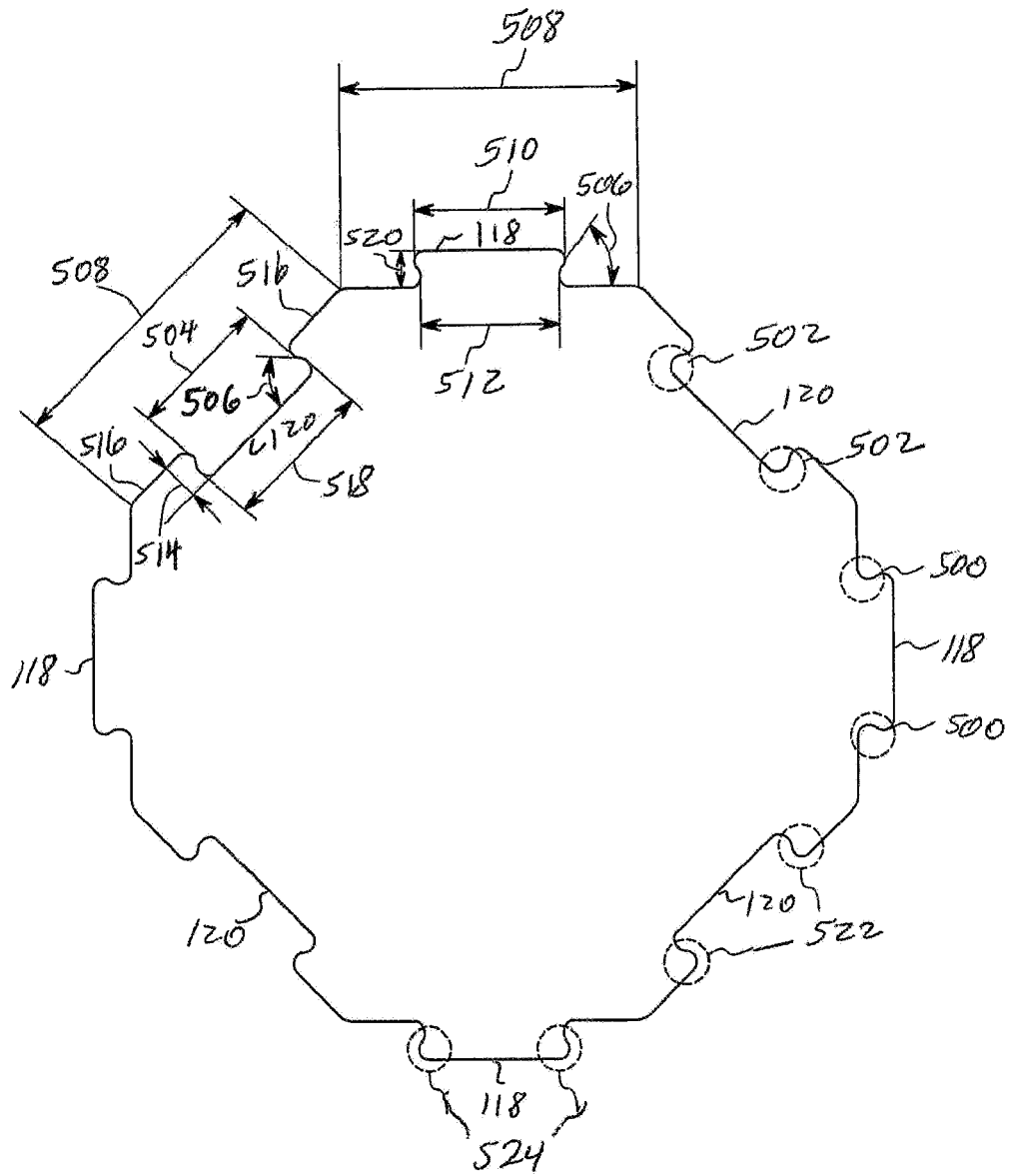
FIG. 5 is a detailed view of exemplary undercuts for lateral connectivity of a container.

In the embodiments, container 100 further provides a mechanism for lateral connection with other containers or devices in a slidable, interlocking manner. Lateral connection of multiple containers 100 is enabled by tongue 118 and groove 120 connectors with undercuts distributed in multiple locations laterally on or within walls 102. Each groove 120 is indented into wall 102 and formed to receive a tongue 118 from a second container 100 or device having similar connectivity features. Preferably, tongue 118 and groove 120 are formed into sides 102 in a perpendicular orientation to the top assembly 200 and the bottom assembly 400. Grooves 118 and tongues 120 are shown in alternating locations on sides of octagonal walls 102, where a groove is placed on every other octagonal wall with tongues placed in a similar alternating design. Alternatively, one or more tongues 118 could be formed on one or more of the sides and one or more grooves 120 could be formed on the remaining sides of walls 102. In other embodiments, a container 100 may have only grooves 118 on its respective side walls 102 while other containers 100 may have only tongues 120 formed in their respective side walls. Regardless of the distribution patterns, separate containers can be interlocked in a tongue-to-groove connection. Connector tongue 118 is a raised, flat, or slightly rounded protrusion formed on or within wall 102. As shown in container longitudinal cross section drawn as a wire frame outline of container 100 in FIG. 5, an interlocking mechanism is created using undercuts 500 of each tongue 118 that can be received into expanded cuts 502 of each groove 120. Undercuts 500 are formed such that tongue 118 connects to wall 102 with a narrower base than the width of tongue 118 at its outermost portion. Because groove 120 width 518 is greater than width 504, when two containers are connected via longitudinal movement of sliding a tongue into a groove, the width of the outer edges of the tongue lock laterally behind each undercut or expanded cut 502. Once interlocked, the two containers cannot easily be separated, or pulled apart, horizontally and can only be readily separated by sliding the tongue out of the groove longitudinally. While each container 100 has at least one tongue 118 or at least one groove 120 in order to interconnect, embodiments can include more than one tongue and/or more than one groove on a single container 100.

Referring again to FIG. 5, a detailed view of exemplary undercuts for lateral connectivity of a container is illustrated. Tongue 118 is formed with undercuts 500 in order to provide sliding interconnectivity with a similar container having a groove 120 with undercuts 502. However, tongue undercuts 500 and corresponding groove undercuts 502 create difficult corners around which thermoplastic material must flow in the stretch molding process when manufacturing a container 100 with such material. It is therefore desirable from a manufacturing perspective to have a container design with the least possible angled degree 506 of undercuts and yet still provide secure interconnectivity among containers. The resulting minimal undercut angles, in turn, require very tight precision in the shape and fit tolerances between tongue 118 and groove 120 (more severe undercuts, if viable, would allow greater shape and fit tolerance between components of connected vessels). For the purpose of interconnectivity, an undercut angle 506 between about 30° and about 75° is sufficient to hold opposing container units in an interlocking manner. However these ranges are the preferred angles and undercut angles αelow and above this range and the dimensions stated below are within the scope of the claimed invention as long as two separate devices with the interconnectivity mechanisms described herein can remain interconnected. In certain embodiments, the groove-tongue assemblies are of modest size. In an exemplary embodiment, each wall face 508 of octagonal container 100 is about 25 mm wide and each tongue 118 width 510 or groove 120 width 504 is about 12 mm at their widest points. Furthermore, as will be appreciated by those skilled in the art, dimensions mentioned herein are relative and can vary depending on the size of a container, the cross-sectional polygonal or circular shape of wall 102, materials of manufacture, and other manufacturing or connectivity factors. The above factors result in a greater risk of groove-tongue disengagement as the undercut angle 506 nears an upper end (e.g., about 75°) of the aforementioned range, and especially where tongue-groove assemblies are of modest size. In contrast, the greater connectivity resulting as the undercut angle 506 approaches the lower end (e.g., about 30°) of the aforementioned range renders molding and de-molding more difficult during manufacture. Thus, a tradeoff exists between the two aims of solidly holding undercuts on the one hand and easier molding/de-molding on the other. Further, the fit tolerance (or "air gap dimension") between grooves 120 and tongues 118 can range from about 0.05 mm to about 1.0 mm, depending largely on the severity of the undercut angles. For example, in one embodiment, the undercut angle 506 is set at about 65 degrees with a fit tolerance or air gap dimension of about 0.05 mm.

Further, a difference in width of the narrowest part of the neck 512 of tongue 120 and a widest width 518 of groove 120 should allow a slidable connection to be maintained between two different containers without a tongue 118 being able to slip out of a groove 120 if the two containers were pulled horizontally away from one another. The protrusion distance 520 of tongue 118 away from wall 102 and likewise depth 514 of groove 120 may vary but should not be so small as to prevent the interlocking of two similar containers.

Figure 6:
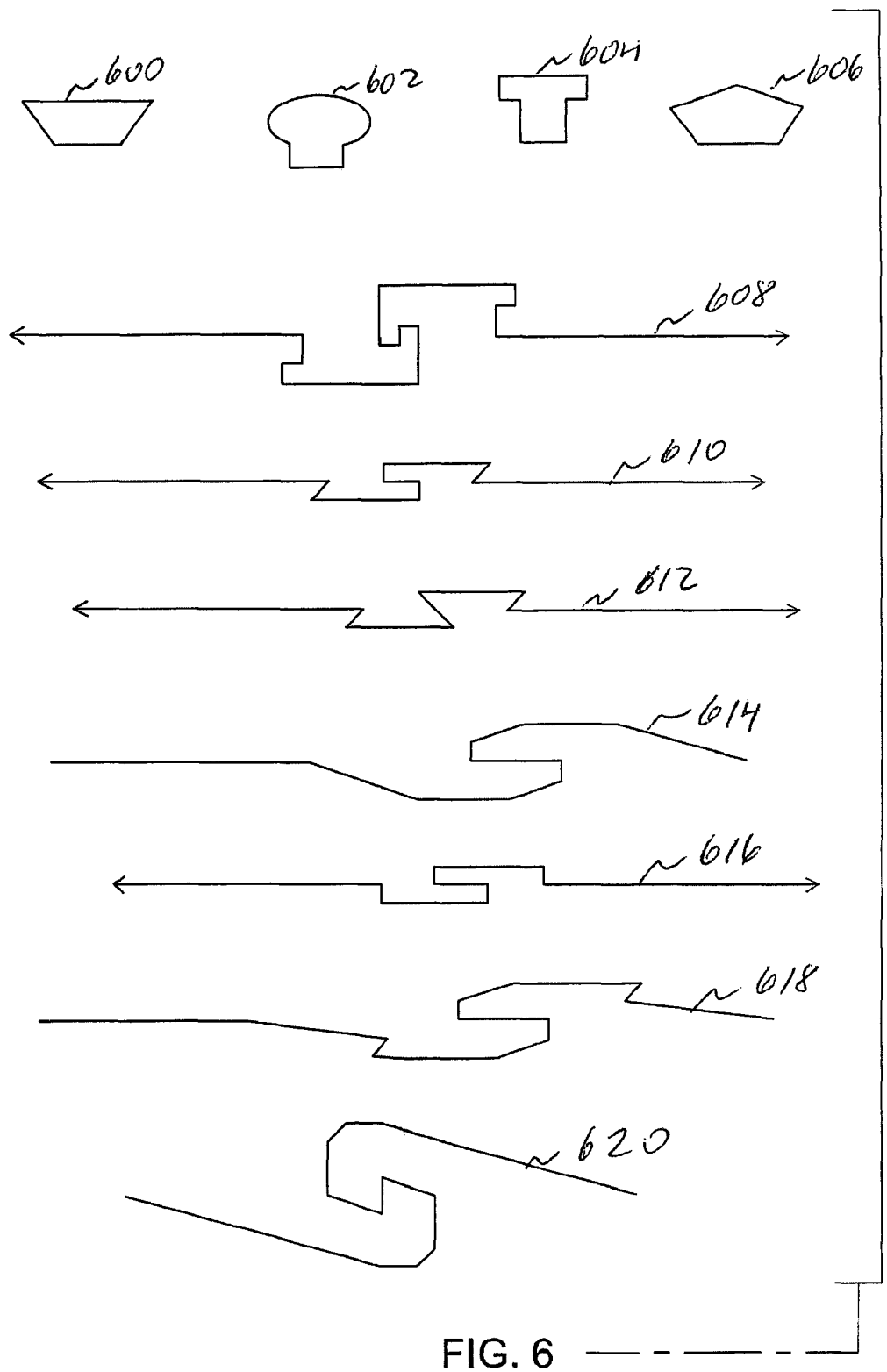
FIG. 6 illustrates multiple embodiments of undercuts and lateral interlocking mechanism designs.

In certain embodiments, lateral interconnectivity may be enabled by any of a number of hermaphroditic, longitudinally sliding connection mechanisms (interlocks having an integrated groove and a tongue) present on each of the sides of the container 100. FIG. 6 illustrates various cross-sectional views of alternative embodiments for tongue and groove connectors. Connectors 600, 602, 604, 606 represent alternative designs of tongue and groove connections between two or more containers. Alternative interlocks 608, 610, 612, 614, 616, 618, 620 are each "hermaphroditic," meaning they possess both tongue and groove aspects in a single connector assembly. One skilled in the art will recognize that alternative embodiments of tongue 118 and groove 120 or the shape of the interlocks shown in FIG. 6 could be a design construction of any shape that allows for interlocking of the sides of the containers.

Further, it should be noted that the tongue 118 and the groove 120 or the interlocks may extend a partial or full length of the wall or side 102. In the illustrated embodiments, the tongue 118 extends a partial length of the side 102 while the groove 120 extends the full length of the side 102. This particular design consideration allows for ease of manufacturing, as is described below in relation to FIGS. 7 and 8, while still providing the ease, flexibility, and sturdiness of the interconnections. In embodiments of a certain size, a recess or an indention may be provided into one of the sides 102 having a tongue 118 with adequate concave space so as to provide clearance for a person's hand to grip tongue 118. This enables a user to hold and manipulate the container more easily, especially with larger and heavier versions. In either case, allowing tongue 118 to fade out short of the full length of the vessel side creates a plane area 122 below tongue 118. The flat space facilitates alignment and lateral interlocking of two vessels 100 by allowing the user to steady the plane area of one vessel against a second vessel before maneuvering tongue 118 into a top of groove 120 and then sliding the tongue 118 in a downward motion into groove 120. Container 100 also comprises wider openings for a short span at the uppermost portion of grooves 120, working with plane 122 to enhance even further the ease of alignment and insertion of corresponding tongues 118 into grooves 120. In other embodiments, grooves 120 have a stop that prevents a tongue 118 from sliding completely free through a groove 120, thus locking lateral connectivity in one direction. In still other embodiments, groove 120 or tongue 118 edges are flexible allowing a tongue 120 to click-fit into a groove instead of sliding laterally.

Figure 7:
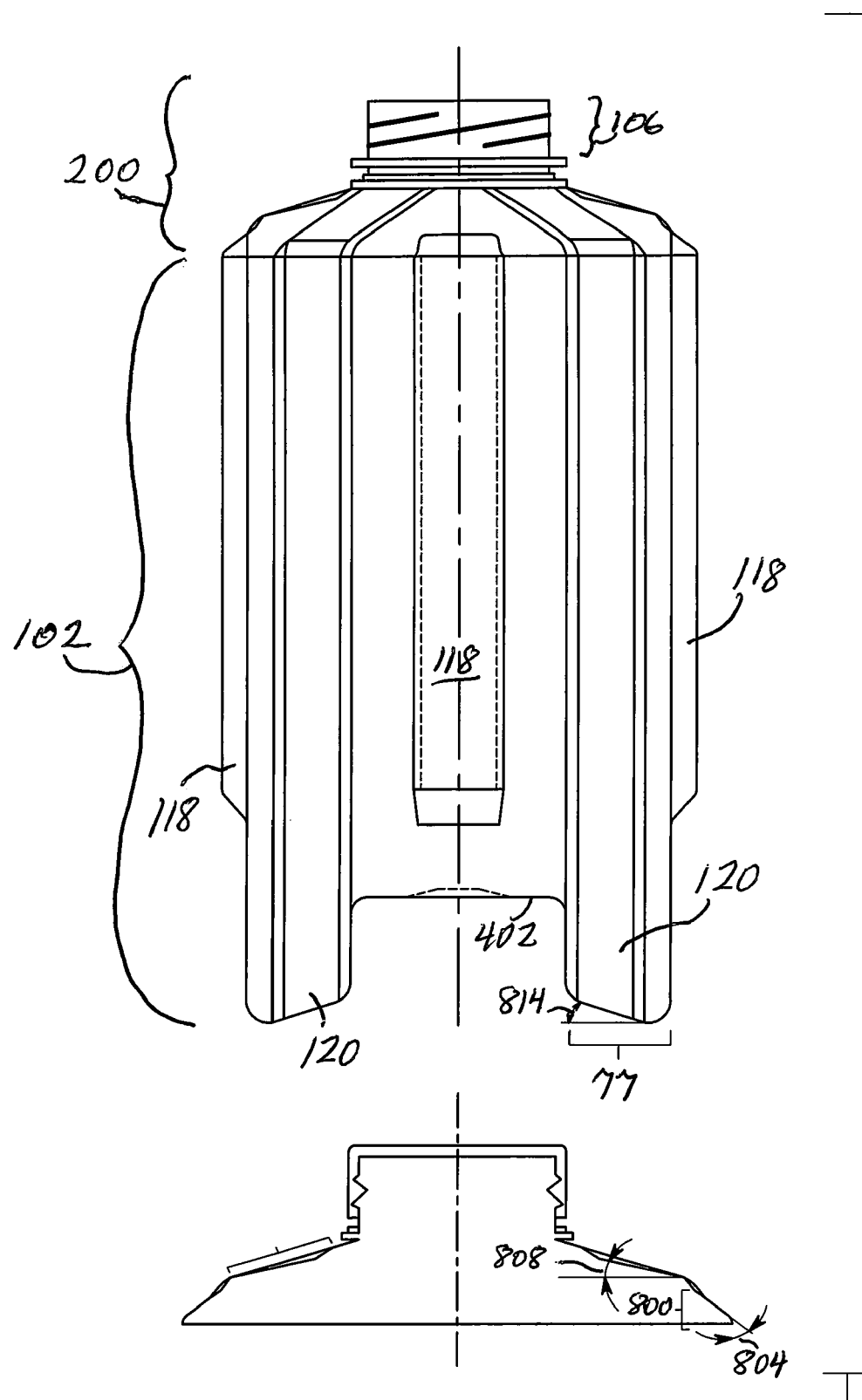
FIG. 7 is a cross-sectional side view of an exemplary container to further illustrate interconnectivity features.
Figure 8:
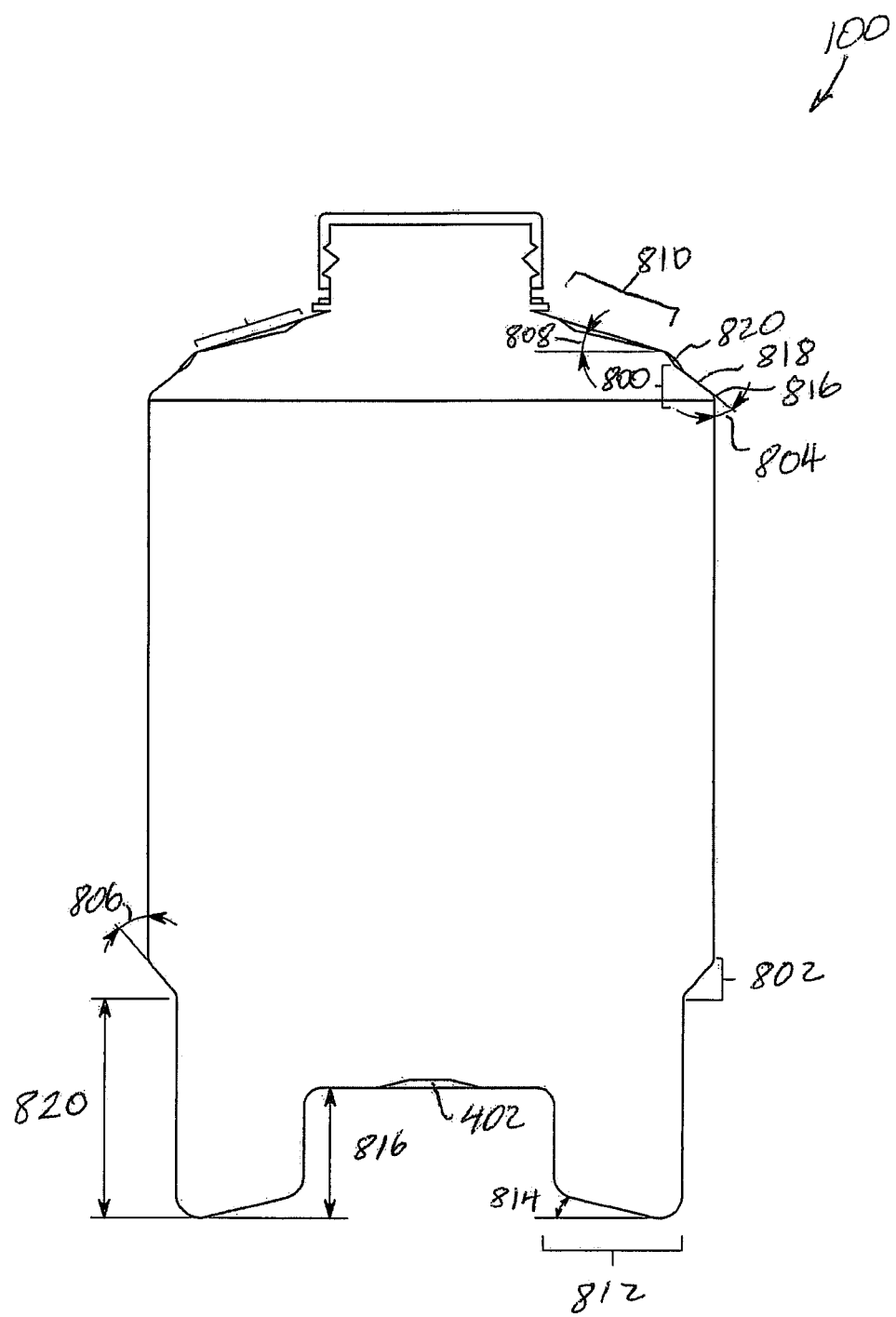
FIG. 8 is a wireframe side view of the container of FIG. 7 illustrating interconnectivity features.

Referring to FIGS. 7 and 8, top and bottom end formations of tongues 118 are illustrated as blending or leading in and out at their ends. In FIGS. 1 and 3, these elements are shown in a partial side view of top assembly 200 and bottom assembly 400, respectively. In order to facilitate thermoplastic flow into a mold and also to ease de-molding, the design for tongue 118 includes these sloped blendings, lead-ins or fade-outs to the tongues 118 at the tongue top 800 and tongue bottom 802 in FIG. 8. A challenge in forming the lead-ins/fade-outs is to determine the appropriate slope for such transitions, recognizing certain trade-offs related to the manufacturing of container 100. The principal trade-off is that while more gradual slope angles 804, 806 suggest easier material flow and vessel de-molding, steeper slope angles 804, 806 preserve slightly more functional tongue length for a greater span of interconnectivity with corresponding grooves 120. With these factors in consideration, it has been determined that workable configurations in slope angles 804, 806 range preferably from about 30 degrees to about 70 degrees; however, ranges could vary below or above these amounts and still stay within the scope of innovative design of the embodiments.

Referring again to FIG. 8, an angle 808 that determines the height of the slope/cap rise 810 serves as a vertical connecting mechanism for top end section 200 to abut rise 812 at angle 814 leading to vertical interconnection receptor 402 from a similar container. As illustrated in FIGS. 7 and 8, cavity rise angle 814 should match as closely as possible the shoulder rise angle 808 so that receptor slope 812 of one container will seat evenly against slope 810 of a second container thereby providing one type of vertical interconnectivity. A design element to account for is that the higher the rise of these components from horizontal, the more lengthy the flow of thermoplastic material into the bottommost extremities during the molding process. Thus, the angle 808 of slope 810 is no steeper than minimally necessary: (a) to allow proper flow of thermoplastic materials to the outer edge of top end section or assembly 200 and to the bottom end section of the container during the molding process; (b) to provide adequate compressive strength and transfer of vertical force; and (c) to allow proper flow of liquid or pourable (e.g., granular or powdered) solids out of the finished vessel. A likely functional range of slope angles is determined to be between about 1: and about 1:1 (otherwise expressed to be between about 11 degrees and about 45 degrees). However, these ranges are merely exemplary and actual ranges could vary higher or lower without deviating from the scope of the claimed invention. In certain embodiments, the slope ratio is selected to be about 1:3 or about 15 degrees. This value is intended to deliver considerable compressive strength (further enhanced by spine ridges 116) while facilitating adequate flow of thermoplastic molding material along slope area 810 of top section 200 as well as adequate flow of liquid or pourable solids out of the finished container 100.

The design of tongue 118 and groove 120 takes into close consideration the tradeoff between (a) the desirability of the widest possible groove/tongue to allow easier thermoplastic flow during molding and (b) the need to leave enough width in the remaining wall spaces 516 (FIG. 5) between adjacent grooves and tongues to allow smooth flow of material into those zones as well. For one exemplary embodiment of vessel 100, a functional range of tongue width 510 is determined to be between about 6 mm and about 15 mm, or a proportional measure similar to spans 516 between adjacent grooves and tongues. Groove dimension 518 at its widest point is slightly wider than tongue head width dimension 510 to facilitate sliding interconnectivity. Likewise, groove overhang dimension 504 is slightly wider than tongue neck 512 to facilitate interconnectivity. In one embodiment, the groove/tongue widths employed are about 12 mm, thus providing about a 12 mm span 516 between each consecutively arranged groove and tongue. Containers with larger dimensions would reflect proportionally wider grooves 120 and tongues 118, and proportionally wider spans 516 between adjacent grooves 120 and tongues 118.

The tongue and groove configuration may be customized based on design of the container and its applications. In certain embodiments, the tongue-to-groove ratio is configured so as to maximize the number of lateral connections that can interlock with additional containers. For example, approximately a 7:1 ratio of grooves-to-tongue in an octagonal embodiment, or approximately a 3:1 ratio in a four-sided embodiment each allows a multiplicity of lateral connections. Further, in certain embodiments, there may be two or more tongues 118 in parallel and corresponding number of grooves 120 in parallel on the sides of an exemplary polygonal container. The grooves are shaped and spaced to slidably receive the two or more tongues from an adjacent container. The same two or more interlocks in parallel on each of the sides of a container enables the containers to interlock with connecting containers at an offset, thereby providing greater interlocking strength and greater flexibility in construction designs. For example, a pair of interlocks or a pair of tongues and grooves in combination enables the containers to interlock with two connecting containers at a time and at an offset of approximately 50%.

As described above, the containers are designed to interconnect both laterally and vertically. In the latter case, the connection is achieved by inserting the top of one container into a matching receptor space in the base of another container. The height of internal rise of the bottom receptor 402 creates a potential encumbrance or related difficulties for thermoplastic flow into the far reaches of the container mold. The presence of complex lateral groove 120 and tongue 118 configurations along the vessel walls 102 renders that challenge even more difficult, especially near the container bottom end section 400, where grooves 120, tongue protrusions 118, and the internal receptor space 402 are all in close proximity. One way to alleviate this molding difficulty is to shorten the length of tongues 118, thereby lessening the design complexity and blow distance below the tongue fade-out point, resulting in easier materials flow into the bottom portion of the adjusted mold. It should be noted that the essential logic of the vessel design (i.e., vertical slide-through side-to-side interconnectivity) discourages a similar shortening of the grooves 120. In certain embodiments, the lowest point of tongue 118 ends at approximately the same elevation as or higher than the highest reach 816 of the internal receptor rise 402. Further, the tongue fade-out 802 should optimally end approximately near to or above the height 816 of the bottom internal receptor space 402; however, the fade-out 802 may be higher or lower than height 802 of receptor space 402 without deviating from the scope of the claimed invention. In one embodiment, a range of about 5 mm is provided. However, an actual range could be higher or lower without being limiting to the scope of the embodiments.

In the shoulder area of top end 200, a spring-point 818 of tongue taper 800 begins approximate to an edge where the upward-sloping section of rising top end 200 meets perpendicular wall 102. The location of spring-point blend 820 depends on a length of taper 800 and angle of taper 804. In one embodiment, the spring-point blend 820 is located about 4 mm to about 5 mm above the spring point 818 of tongue taper 800. However, this range is merely exemplary and actual ranges could vary higher or lower without departing from the scope of the claimed invention.

Figure 9:
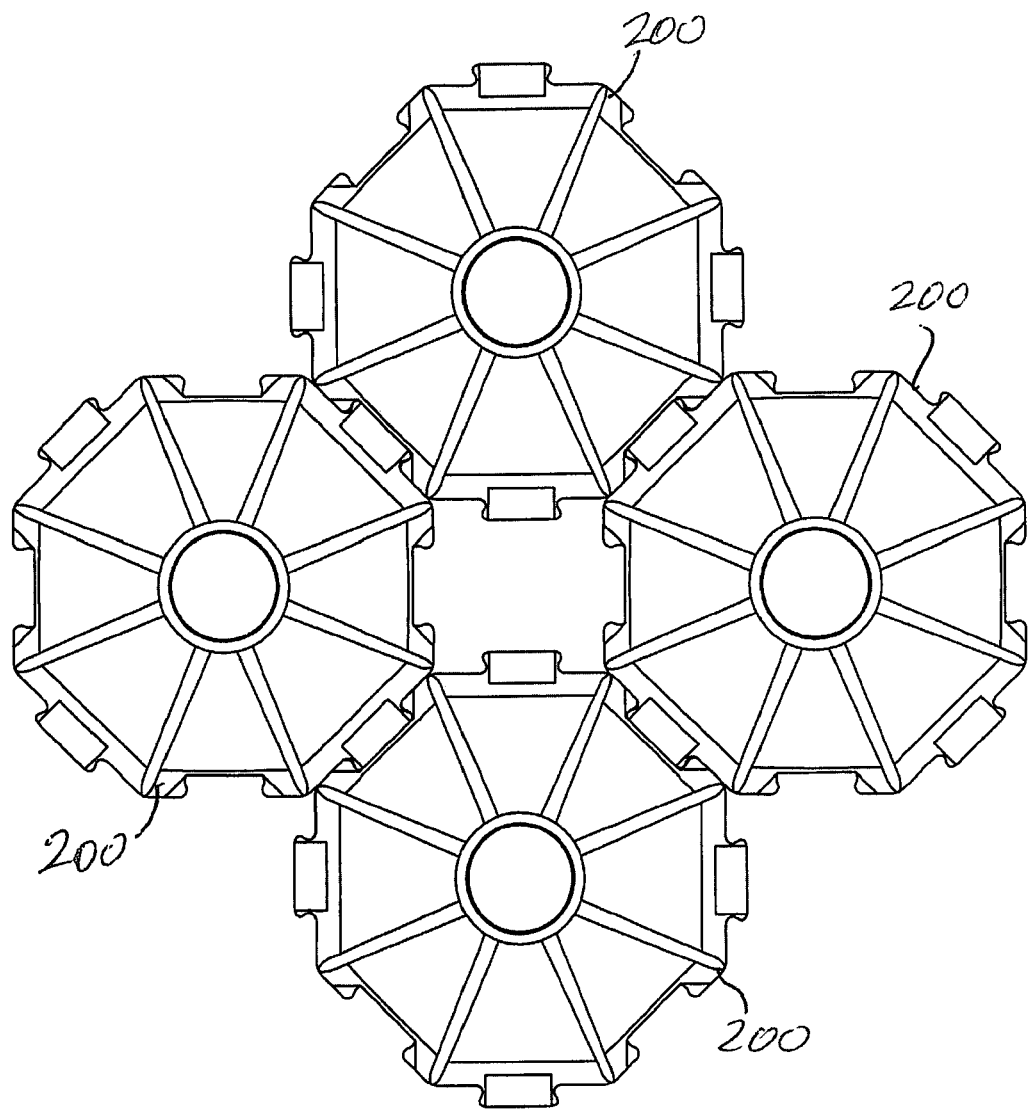
FIG. 9 is a plan view of multiple exemplary containers interconnected horizontally.
Figure 10:
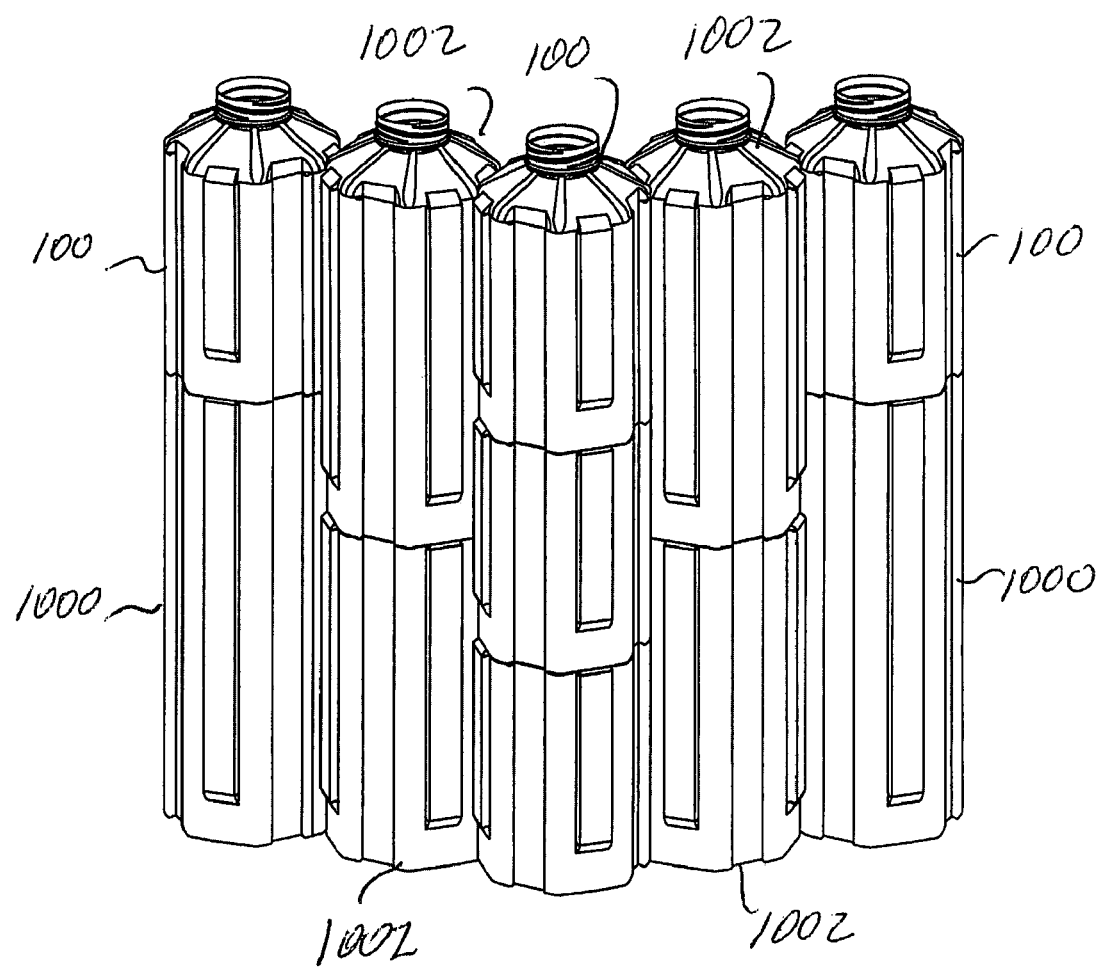
FIG. 10 is a view of multiple exemplary containers interconnected vertically and horizontally.

A plurality of devices having the connectivity mechanisms described herein may be interconnected by stacking them vertically (as shown in FIG. 10) as well as horizontally (as shown in FIG. 9). To illustrate the vertical connection, FIG. 7 shows bottom end receptor 402 of a first container 100 that can receive a cap secured to protruding neck 106 on a top-end section 200 of a second container 100. Top-end assembly 200 on a second lower container 100 contacts makes frictional contact with receptor space 402 of the upper container 100. Such vertical stacking requires adequate compressive strength in the neck and wall structures of a container. Moreover, the side-to-side connection between grooves 120 and tongues 118 in these containers are more easily attained where top-bottom connections result in well-aligned sides, i.e., where grooves/tongues of a given lower unit 100 are aligned with the grooves/tongues of the container above, thus presenting a continuous insertion path for corresponding grooves/tongues of additional containers having similar groove/tongue dimensions. Thus, it is desirable that the finished containers include some effective means to facilitate such alignment. One such means is to provide for a series of regularly-spaced spines or ridges 116 on a top end 200 radiating outward from the container neck base 110. As explained previously, the corresponding series of regularly spaced channels 406 are provided radially on the inwardly sloping bottom end 400 of the container to receive ridges or spines 116 from a separate container 100. Fitting ridges 116 and channels 406 together also assists in the alignment of the tongues and grooves when stacking multiple container units, such as shown in FIG. 10.

The receptor or indented connecting profile comprising bottom assembly 400 reduces the volume per unit of vessel height. In order to minimize volume loss and, relatedly, to ensure height-to-width proportionality and resulting vessel stability, it is critical to reduce as much as reasonably possible the height of receptor space 402. It should be noted that minimization of the bottom receptor 402 is a function of minimizing the size of the corresponding vessel neck assembly, including neck rise 106, transfer ring 108, tamper evident ring (where needed) and a cap, together an assembly which connectively inserts into bottom receptor 402. Generally, the narrower and shorter such a neck assembly is formed, the smaller the corresponding bottom receptor space 402, thereby reducing volume loss and compensating container height.

A container 100 may be placed into commercial distribution. It is therefore desirable to provide adequate spaces on the exterior surface of container 100 for printing, stamping, or affixing labels, marks, identification of manufacturer, content list, advertisements, images, and other useful information. The complexity of the design, with its several prominent surface folds, makes meeting such labeling needs more challenging. As discussed above, the shortened length of tongue 118 provides below each such tongue a flat rectangular area suitable for printing critical information and/or images directly onto the vessel surface or otherwise for affixing an informational sticker, wrapper or banner. Typically, adequate sizes for such an area range from about 15 mm to about 50 mm per surface side (i.e., from about 225 mm² to about 2,500 mm²). The flat surface under each of the tongues 34 on a container design with a capacity of approximately 250 mL is about 21 mm×21 mm (i.e., about 441 mm²). Containers of larger dimensions would reflect proportionally larger surface areas for the stated purposes.

Further, the containers 100 may be fabricated in various standard volumetric and physical sizes. These varying sizes of containers maintain an identical depth in their footprint for ease of interlocking with on another other and with containers or devices of other sizes, thereby retaining universal interconnectivity. The embodiments may include a variety of volumetric capacities such that an arrangement of different containers side-to-side would be similar (the heights of containers having different capacities will likewise differ). In short, each container retains interchangeable side-to-side interconnectivity and retains top-to-bottom vertical interconnectivity. One skilled in the art will recognize that the perfect scalability of the containers can yield a large number of volumetric capacity ranges and combinations. Moreover, in certain embodiments, the number of grooves and tongues or the number of interlocks on each of the sides of the container may be two or more, which configuration provides greater flexibility in building a wall of containers at varying angles. Additional grooves and tongues may also be provided on each side of a container for increased interlocking strength.

As an exemplary embodiment, the octagonal container 100 illustrated in FIG. 1 comprises four tongues and four grooves. Strength of vessel construction is achieved in this design due to (1) twenty-four folds created by eight corners and eight connectors (each tongue and each groove has two folds), and (2) at the top and bottom assemblies, eight spines/ridges and eight corresponding grooves. The pattern resulting from all such features retains symmetry in design, a quality allowing all the advantages of mass manufacturing and ease of assembly with other similar containers in addition to achieving great design flexibility in building structures. For example, the enhanced connectivity of the 4:4 octagonal vessel 100 allows structures with walls departing at both/either about 90 degree and about 45 degree angles; consequently, resulting structures need not be restricted to those with squared or rectangular outlines. The aforementioned strength of the unitary vessels, drawn from the numerous folds in the form, in turns lends decided robustness to structures made from multiple such units.

Because container 100 is scalable, the range of workable measurements is also scalable. At the smaller end of volumetric container scale (approximately 250 mL), effective top-bottom connectivity of the vessels results where measurements of the top portion neck-cap assembly and corresponding bottom receptor space have a height in the range of about 15 mm to about 30 mm and width in the range of about 25 mm to about 50 mm. In one exemplary embodiment, the container design incorporates the slightest available neck assembly. For example, for a container with a capacity of approximately 250 mL the design considerations may be as follows: (a) a straight wall neck section 106 ascending from the neck base to ring 108 of about 1-5 mm; (b) the diameter of a neck base ring 108 of about 29.25 mm; (c) the diameter of both the cap on neck 106 and ring 108 about 27.92 mm, and; (d) a rise from the neck base to the top surface of the cap closure of about 10-15 mm. However, it should be noted that because the shape and size of the container is scalable, these dimensions should not be read in a limiting sense; one skilled in the art will recognize that container volumes other than 250 mL may incorporate changes to measurements in proportional or reasonably proportional fashion.

As an example a functional range for the size and contour of such spines or ridges 116 and corresponding channels 406 is: about 1 mm to about 10 mm in width and about 0.5 mm to about 5 mm in height where ridge 116 departs neck 104, and; about 2 mm to about 20 mm width and about 0.5 mm to about 10 mm in height where ridge 116 base meets the shoulder turn point 820. A minimal fit tolerance/air gap dimension is formed at the corresponding channels 406. In one exemplary embodiment, the size and contour of ridges 116 and corresponding channels 406 for a container 100 with a capacity of approximately 250 mL is: (a) about 2-5 mm width and about 1-3 mm height where the ridge 116 departs neck base 110 of the container; (b) about 2-5 mm width and about 1-3 mm height where the ridge 116 base meets the shoulder turn point of container 100; and (c) about 0.05 mm fit tolerance/air gap dimension at the corresponding channels 406. The topographical curves of spines or ridges 116 must be such that lateral de-molding is not hampered. Containers or vessels of larger volumetric capacity and dimensions might incorporate proportionally higher and broader ridges/channels. As one skilled in the art can determine, these ranges are merely exemplary and can increase or decrease without falling outside the scope of the claimed invention.

As stated above, once the container has been manufactured by employing the techniques described above, an additional challenge may be to decouple the three-part mold without tearing or otherwise damaging the container. Several considerations may be taken toward decoupling of molds from the finished product as will be described in greater detail below.

Most containers formed via ISBM emerge from three-part molds. Two laterally moving mold parts (either directly opposing or "clamshell" hinged) normally comprise the largest portion of the mold, engaging (and disengaging) at a point on the preform neck, and extending downward for the great majority of the container length. The third mold part—which can be described as the "push-up" or bottom insert—forms the relatively short bottom portion of the vessel, engaging and disengaging vertically. Because most ISBM formed container bases have at least a slight recession or indentation (in essence, an undercut), the bottle mold cannot disengage without that third mold part vertically withdrawing. In the present set of inventions, in order to provide multi-directional interconnectivity to the containers of the present invention, it is desirable to incorporate a series of undercuts along the lateral surfaces and a large recession undercut at the base meant to receive the top-side shoulder/cap configuration of other like units. These features render considerably more complicated the standard method of mold decoupling, i.e., again, via a two-part laterally moving mold covering the majority of the vessel surface, supplemented by a short stroke vertically moving bottom mold piece.

In a reversal or inversion of the logic of the standard approach, the mold decoupling for the current container designs requires (a) a pair of directly opposing mold parts (i.e., not clamshell hinged) engaging on a point of the parison neck but extending downward only to the top end shoulder turn of the intended vessel, and (b) a long-stroke bottom "cup mold" or "can mold" engaging and disengaging vertically until reaching the aforementioned shoulder turn. The longer bottom push/pull stroke requires selective modification of currently available molding equipment. More specifically, such modifications include a bottom stroke assembly sufficiently long to vertically disengage the part of the mold forming the entire vessel from its bottom to the start of the shoulder, with the two laterally moving mold parts only forming the top end from the shoulder and covering the neck of the vessel.

The abbreviated vertically closing bottom "cup" molds for bottles manufactured via ISBM, where employed at all, typically have a slight taper in order to ease decoupling. Because the containers of the present invention are designed to allow units to slide-lock with one another on their side surfaces, the lateral walls cannot taper inward. Decoupling via a relatively long push/pull stroke is considerably more challenging due to the greater potential for sticking, dragging and scratching. One way of alleviating these problems is to reduce drag by employing nonstandard or less frequently used mold metals (e.g., stainless steel instead of aluminum) and then carefully controlling molding temperatures, cooling rates and PET characteristics. Another is to reduce drag by treating the mold surface with a special material, compound, or coating that reduces friction. For just one example, a nickel-ceramic coating might reduce friction to a considerable percentage of that seen with an uncoated surface. Other coatings such as but not limited to nickel-Teflon® may also be employed.

It should be noted that such special coatings may not eliminate all scratch marks. In such cases, it may be beneficial to incorporate subtle vertical striations as design considerations. These subtle vertical striations may provide both further aesthetic distinction and potentially even a more positive connection between units.

The above described technique of forming and decoupling containers with undercuts presents yet another difficulty to surmount. The conjunction of the three mold parts in the above described technique occurs at or very near the shoulder turn of the given container. Further modification of the groove insertion points and tongue fade-outs is necessary to allow the upper two opposing mold parts to decouple without hanging up on the undercuts in that area, as further discussed below.

Eliminating the de-molding impediments at the shoulder area requires a series of subtle counter-cuts at precise points along a precisely selected line. Each top corner of each groove 120 and tongue 118 is modified to allow the two directly opposing upper molds to decouple without hanging up on what would otherwise be undercuts. This effect is achieved by locating the vertical parting line between the two upper mold sections at the exact center of two opposing tongues, and above the horizontal mold line, reconfiguring the top portions of the tongue and groove assemblies so that no undercut 500 or 502 impedes retraction of the two directly opposing top mold sections.

It should be noted that, in order to surmount the molding and de-molding challenges for manufacturing the container of the present invention that centrally incorporates undercuts, the choice of currently available blow molding machinery plays an important role and should be carefully considered. The various experiments and calculations leading to the molding/de-molding designs discussed herein led to the selection, at least initially, of linear ISBM machines, rather than rotary machines. In essence, the container designs of the embodiments call for an opposing two-part mold assembly (rather than a hinged two-part clamshell assembly) to form and then detach from the upper section of the vessel (i.e., the section above the shoulder turn). Opposing molds are typically possible with linear ISBM machines.

The several aspects of the technique, as described in the various embodiments, enable manufacturing of complexly shaped containers (i.e., sporting a plurality of undercuts) in high volumes (tens or even hundreds of millions per year) and in a cost-effective manner.

Figure 11:
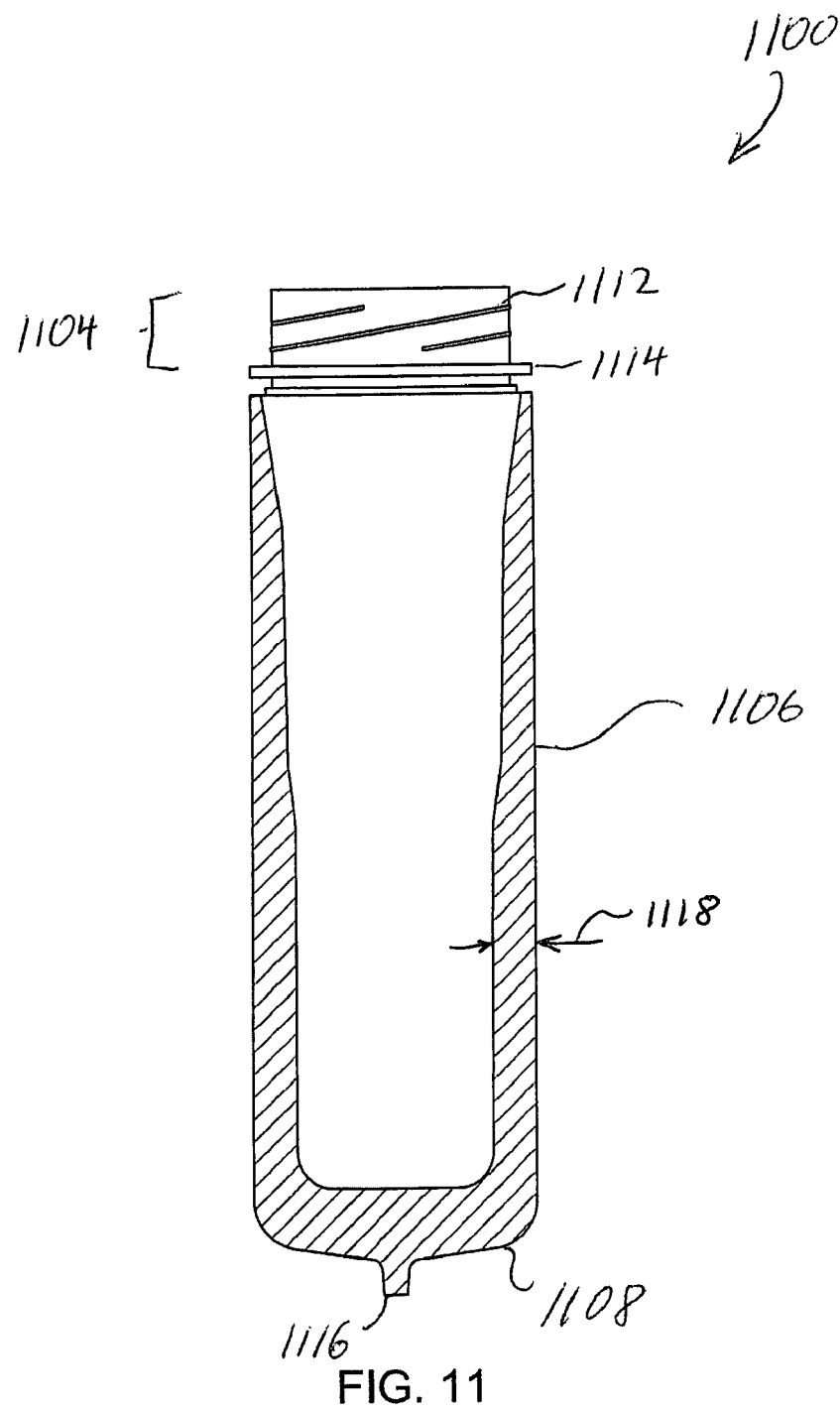
FIG. 11 is a side view of a parison made according to the embodiments
Figure 12:
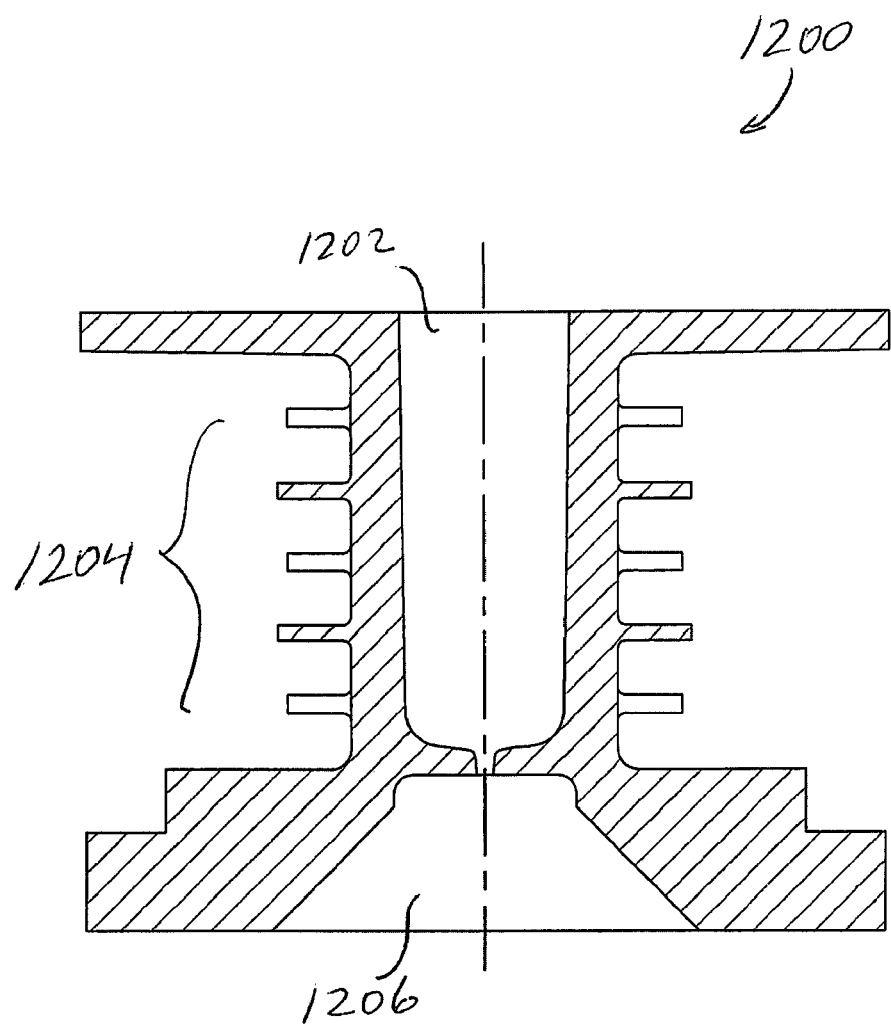
FIG. 12 is a cross sectional view of a parison cavity according to the embodiments.

As will be appreciated by those skilled in the art, a new thermoplastic preform or parison may need to be designed in order to manufacture the modular containers described in the embodiments discussed above. Referring to FIGS. 11 and 12, a workable preform or parison 1100 results from calculations specific to a container and process and mold used to manufacture the container. In certain embodiments, areal (axial×hoop) stretch ratio for the preform 1100 is about 4.0 to about 12.0, axial stretch ratio is about 1.5 to about 3.4, and hoop stretch ratio is about 2.2 to about 4.5. In certain embodiments described herein, the areal stretch ratio is likely set between about 4.5 and about 6.7, axial stretch ratio is set between about 1.6 and about 1.9, and hoop stretch ratio is likely set between about 2.8 and about 3.5. To facilitate a stretch blow process in the novel mold cavity design of the embodiments, preform 1100 is formed via injection blow molding in a preform mold cavity 1200 as a closed-end cylindrical article similar in basic shape to a test-tube for use in manufacturing a plastic container such as bottle 100. Preform mold 1200 includes parison cavity 1202, parison shells 1204 for spacing a length of preform 100, and nozzle tip assembly 1206 where melted plastic is introduced into cavity 1202. Preform 1100 includes neck section 1104, which is located adjacent to an open end of the cylinder and formed with threads 1112 and ring 1114. Throughout the stretch blow mold process, neck portion 1104 remains substantially the same shape, size, and configuration. Preform body section 1106 in the shape of a cylinder is connected to closed-end bottom section 1108, which includes a protruding tip 1116, an artifact of the injection process. Wall thickness 1118 may vary by design or by artifact. The weight of plastic increases with wall thickness 1118, where excessive thickness can cause sagging of the plastic in walls 1118 after the internally engaging preform injection rod or preform core rod (not shown) is withdrawn. These variations will affect only the internal diameter of the preform because the external diameter is limited by the diameter of preform mold cavity 1202. Preform internal shape can be varied by varying the diameter of a preform core rod used for blowing operations in cavity 1202. In a preferred embodiment, bottom end preform area 1108 has thicker walls 1118 than the body section 1106 in order to facilitate plastic flow into a bottom section of a blow mold cavity of the embodiments, as described below.

ISBM techniques of the embodiments can be performed using the hot parison technique, where after formation preform 1100 is immediately transferred to a conditioning station where the potential heat within the preform gained during the preform injection mold process can be utilized and fine-tuned for final container ISBM operation. The distribution of heat in the hot closed-end preform highly influences the wall thickness and plastic flow of a hollow container that is to be blown. Irregularity in temperature of a preform 1100 can create defects in a blown container related to too thin walls of a portion of the container or the inability of the plastic to flow in a mold due to cooling and hardening of the plastic. A technique to address these problems is to use an optional preform temperature regulating or conditioning stage accomplished with a heating apparatus at a location such as an exemplary conditioning station 1300 illustrated in FIG. 13.

A second means to overcome or render inconsequential the uneven heat distribution in performs is to give additional treatment to the parison once transferred to the conditioning station. In the varieties of ISBM machines contemplated here, the conditioning station consists of a hollow, fluid filled, central conditioning pin inserted in the preform as the preform is suspended inside but not touching the wall of an open-topped conditioning pot. The specific conditioning pot in the present case is designed to have multiple heating elements aligned around its external perimeter or/and internal cavity walls, such heat bands, coils or tubes configuration in a manner allowing the achievement of varying and zone specific temperatures vertically along the preform as necessary for optimal resin flow during the following blow stage.

Moreover, in the present case, at least some areas of the preform will achieve higher internal and surface temperatures than typical in the conditioning stage of ISBM processes, the result of the combined effects of the conditioning pot heating elements and hotter than normal fluid distributed in the hollow center of the conditioning pin. The temperature range for each subzone of the preform must be high enough that, during the later blow stage, the PET resin flows adequately into the full reaches of each of the several undercuts and tight corners of the bottle mold, yet not so high that the resin does not sufficiently cool before the mold sections open. Three heating bands presently wrap around the conditioning pot. They are stainless steel with ceramic and electric filament interiors.

Figure 13:
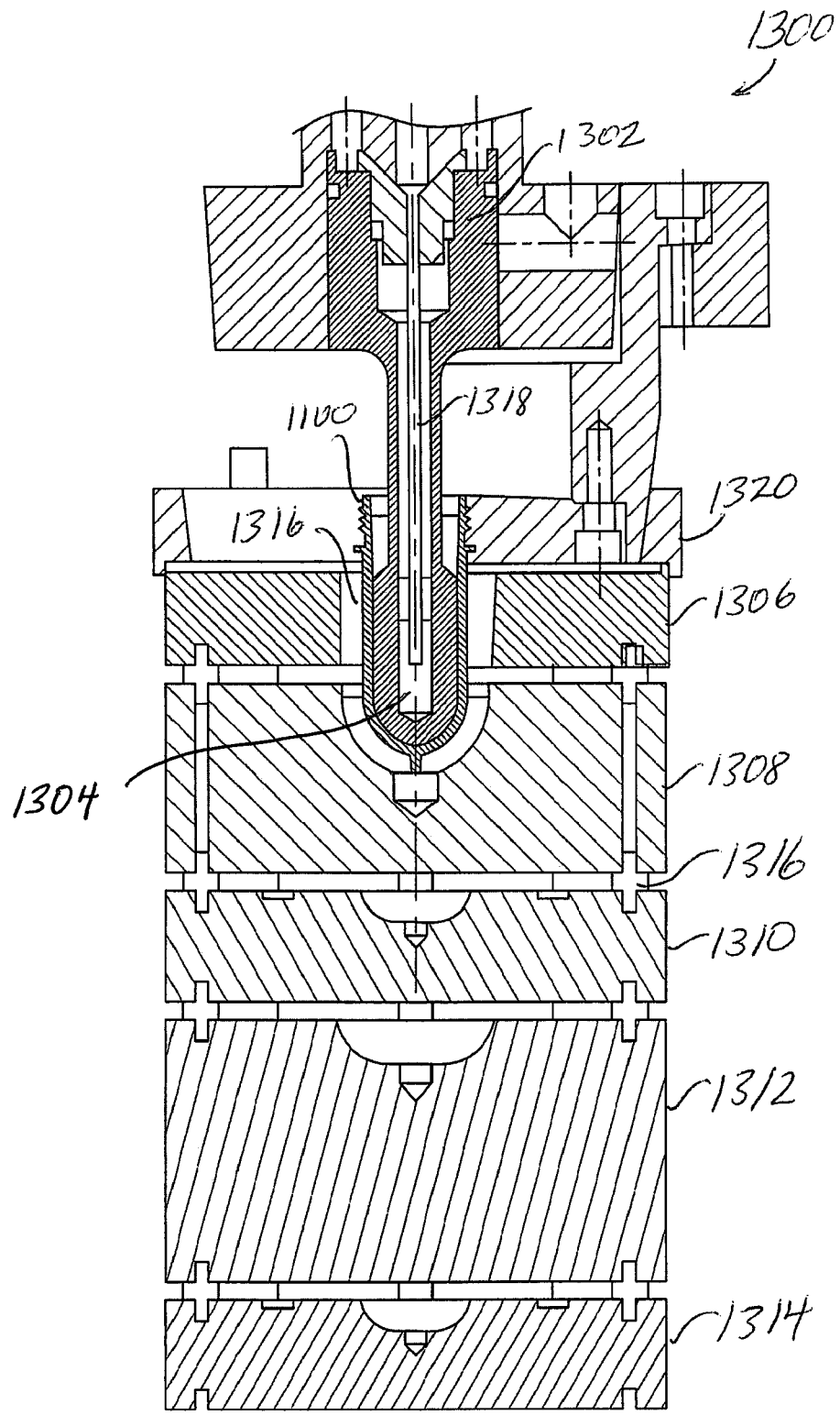
FIG. 13 is a cross sectional side view of a parison conditioning station according to the embodiments.

Referring to FIG. 13, preform conditioning assembly 1300 includes parison conditioning cavity 1316 which receives preform 1100. Conditioning core tip 1304 is attached to the end of conditioning core rod insert 1318, which is controlled at conditioning head 1302. Conditioning head 1302 includes a bubbler head, bubbler tube, and ring. Core rod 1318 and tip 1304 insert into preform 1100 during operation. Housing of the conditioning pot 1300 is provided by top conditioning chamber 1306, which sits above conditioning chamber 1308. Optional conditioning spacers 1310, 1312 and 1314 sit below bottom chamber 1308 in the arrangement. Preform neck insert 1320 secures preform 1110 in place during operation. In a temperature regulation stage, preform 1100 is provided a distribution of heat specific to certain areas of the preform by conditioning pot 1300 in order to facilitate stretching. For example, distribution of heat to end section 1108 can be higher or lower than distribution of heat within body 1100, or one side of the cylinder of body 1100 may be heated to a higher temperature than an opposing side in order to promote a desired thickness throughout a hollow molded container or article in the ISBM stage.

To produce the exemplary modular interlocking containers, the above set of ISBM variables has been carefully determined. It should be noted that ISBM variables often are unique to a given container design. In certain embodiments, the mold temperature can range considerably and is largely dependent on the shape, number, placement, and scale (height, width, depth) of the desired container protrusions. Radial and axial ratios can range from about 1.5 to about 4.5 and are dependent on the distance and configuration of the furthest outlying reaches of the given container. Moreover, in certain embodiments, the temperature of the mold is selected to be in a higher than normal range in order to prevent the expanding material from cooling too quickly. Additionally, for the purposes here, both axial and hoop stretch ratios are selected to be on the lower side of the range in order to allow the material to flow deep into the various bottle protrusions. For example, in certain embodiments, radial and axial ratios are set between about 1.6 and about 3.5.

As noted previously, one of the challenges with ISBM technique is to coax the molding material into and around tight corners. The task is more difficult when such corners are hard, or "sharp," i.e., non-rounded. The tongue 118 and groove 120 assemblies have several edges where plastic flow might be stopped or impeded in the absence of rounded edges. However, rounding off the "corners" 500, 502, 522 and 524 also translates into a shortening of the undercutting facets of the tongues 118 and grooves 120. Thus, the more specific challenge is to incorporate where appropriate such rounded features in a manner not overly compromising the strength of the related undercuts 500 and 502, particularly given the need already to limit the angle 506 of the undercut for purposes of easier molding and de-molding, as discussed above. It has been determined that to meet the challenges described above, measures of rounding off tongue and groove corners 500, 502, 522 and 524 range preferably from about 0.6 mm to about 1.4 mm. In certain embodiments, the measure of rounding employed is between about 0.8 mm and about 0.9 mm. However, these dimensions are exemplary and could be lower or higher and still remain within the scope of the present invention.

Figure 14:
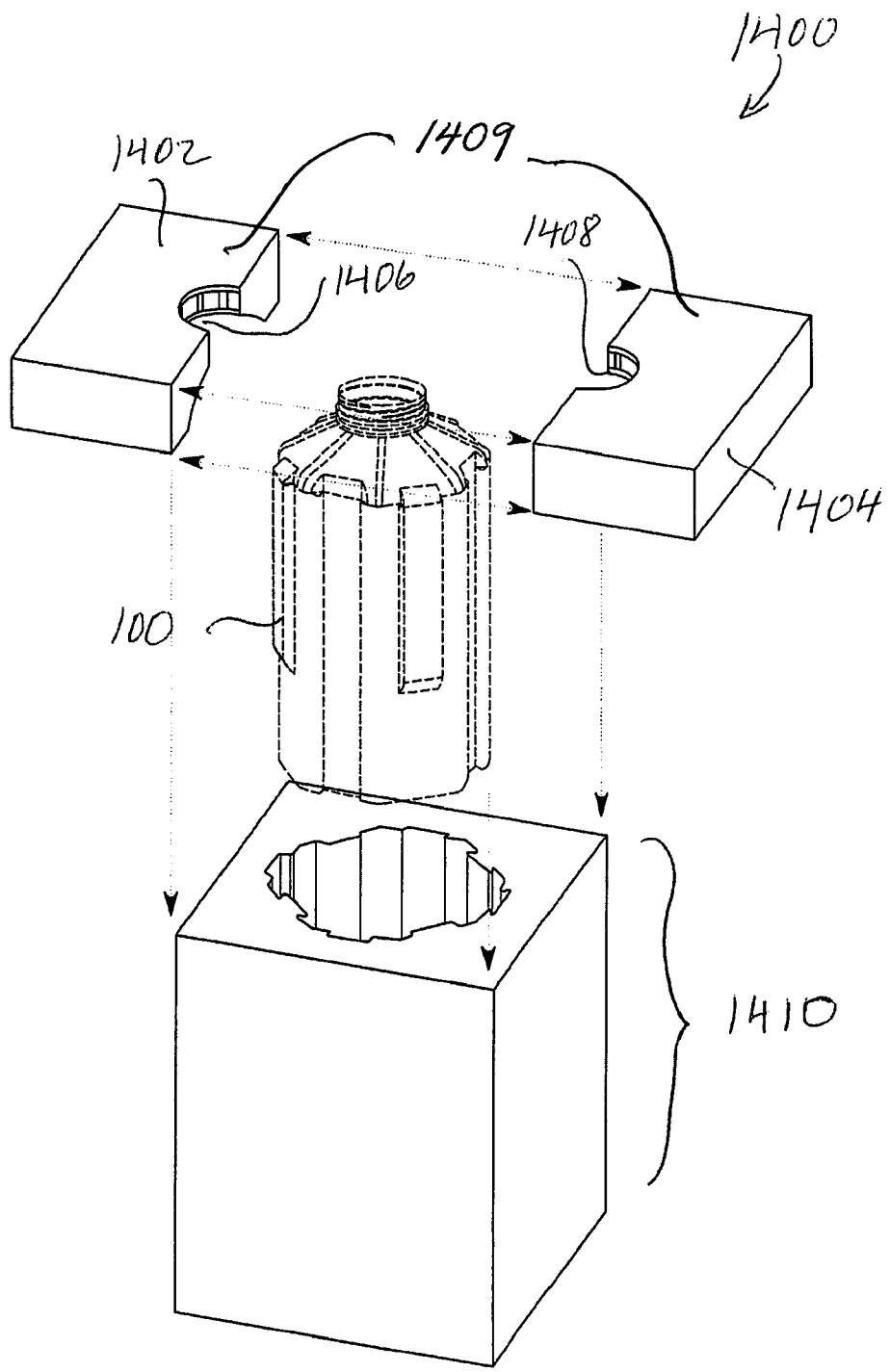
FIG. 14 is an exploded isometric view of a stylized stretch blow mold apparatus embodying the invention.

Referring to FIG. 14, a stretch blow mold body cavity apparatus 1400 embodying the present invention in a basic exemplary block form is illustrated including a movable first mold body cavity section 1402 with first neck insert assembly 1406 and a directly opposed moveable second body cavity section 1404 with second neck insert assembly 1408, which two sections close together horizontally to form a top body cavity section 1409 and neck insert assembly of blow mold 1400. Body cavity body section 1410 is vertically movable to an open or closed position with body cavity top end sections 1402 and 1404 for molding operations. In the embodiment, body cavity mold section 1410 is constructed from multiple, dual mold side halves and a bottom mold assembly, wherein the two sides of the mold section are attached together with the bottom section to form a single mold cavity that operates as an undifferentiated assembly unit during ISBM molding operations. This arrangement also provides ease of milling each section and ease of repair and replacement when disassembled. Exemplary mold sections are described and illustrated herein in their half and bottom sections for disclosure and explanation, however it should be understood that disclosure of a half section applies to each respective complementary half mold section that is needed to complete an entire mold section or body.

It is understood that an ISBM machine that is operative for moving body cavity shoulder sections 1402 and 1404 between open and closed positions with body section 1410 of the body cavity wherein a molded product 100 can be held steady or lifted at its neck via neck insert assemblies 1402, 1404 while body section 1410 is lowered to an open position, thus removing article 100 from the mold body cavity 1410.

Figure 16:
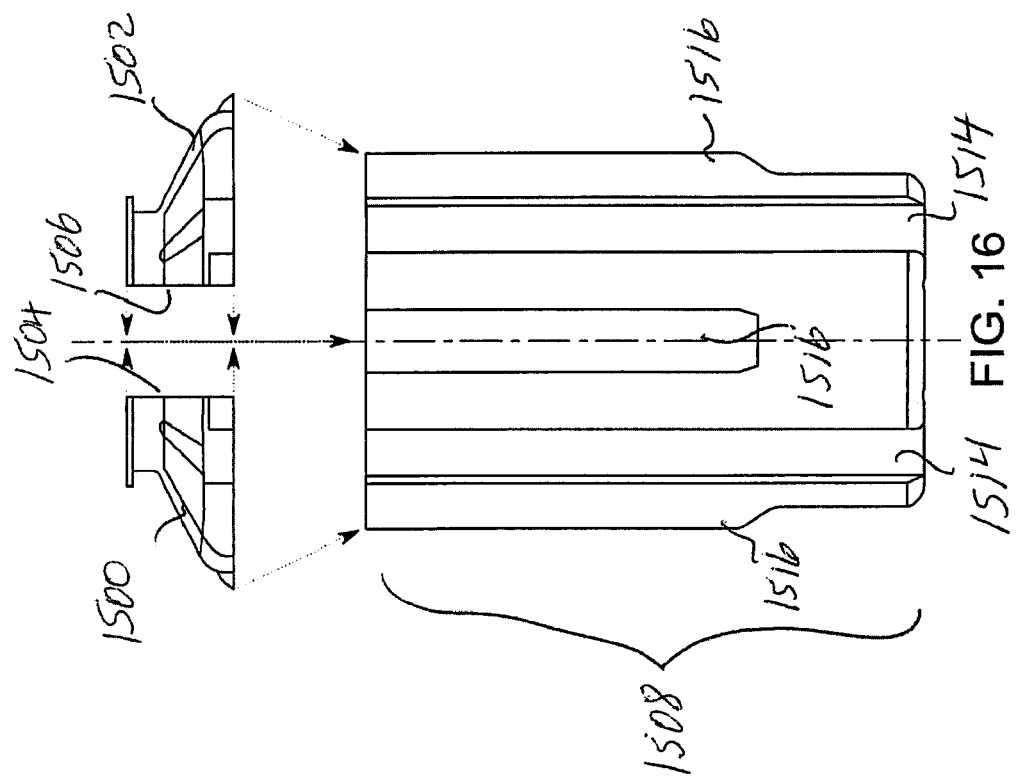
FIG. 16 is an exploded side view of the contours or profile of the shoulder and body mold sections illustrated in FIG. 15.
Figure 15:
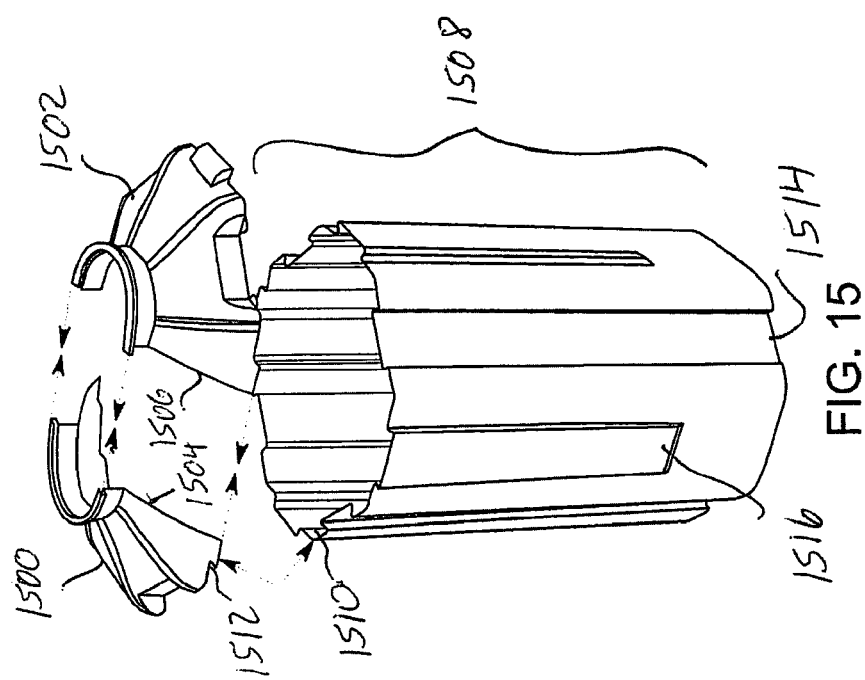
FIG. 15 is an exploded isometric view of the contours or profile of the shoulder and body cavity mold sections of the embodiments.

FIG. 15 illustrates a more detailed isometric exploded view of the contours or profile of the mold body cavity embodiment of FIG. 14, and FIG. 16 illustrates a side view of the contours of profile of the mold cavity embodiment in FIG. 15. First body cavity top end section 1500 and second body cavity top end section 1502 can be movably oriented between an open position and a closed position, where sections abut along mold lines 1504 and 1506. Body section 1508 of the mold cavity can be moveably positioned or oriented so that mold line 1510 abuts or seals along mold line 1512, which is formed when shoulder sections 1500 and 1502 are oriented in a closed position.

In the embodiment illustrated in FIG. 15 and FIG. 16, body section 1508 is illustrated as the internal contours or profile of a mold cavity comprising an octagonal cross-sectional configuration. The invention is not limited, however to an octagonal cross-sectional mold cavity and could be formed with circular, oval, triangular, square, rectangular, hexagonal, or irregular shapes, for example. One skilled in the art will understand that the cross-sectional and longitudinal shape of the body section 1508 could be a design construction of any polygon, circle, ellipse, or irregular outline, and could have different heights, diameters or cross-sectional areas, or openings while still forming an article of manufacture. It should be noted that, in certain embodiments, the design is that of a regular polygon.

In some embodiments, body section 1508 further provides the contours or profile of a mold for manufactured plastic articles having mechanisms for lateral connection with other containers or devices in a slidable, interlocking manner. A longitudinal wall or walls of body section 1508 are formed as perpendicular or nearly perpendicular to a flat base, or in other words in parallel with one another such that one side of a container formed by the mold can connecting laterally with a side of a similar container. A groove 1514 is indented into body section 1508 and formed and each tongue 1516 is raised on body section 1508. In a preferred embodiment, grooves 1514 and tongues 1516 are shown alternating around the sides of octagonal walls of body section 1508, a groove is placed on every other octagonal wall with tongues placed in a similar alternating design. Alternatively, one or more tongues 1516 could be formed on one or more of the sides and one or more grooves 1514 formed on the remaining sides. In other embodiments, a body section 1508 may have only grooves 1514 or may have only tongues 1516 formed around the side walls of the section. Tongue 1516 and groove 1514 may extend a partial or full length of body section 26. In a preferred embodiment, groove 1514 extends the length of body section 1508 while tongue 1516 extends from top mold line 1510 to a partial length of body section 1508. Regardless of the distribution patterns or lengths, a tongue 1516 and groove 1514 are formed on plastic articles that, as is explained below according to the embodiments, can be interlocked in a tongue-to-groove connection due to undercuts, or dovetails, formed by the connectors.

Figure 18:
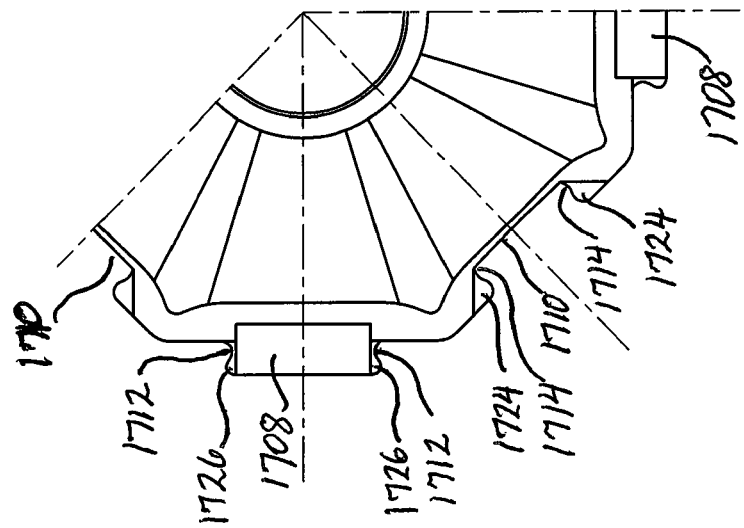
FIG. 18 is a partial plan view of the contours or profile of the shoulder section assembly in FIG. 17.
Figure 17:
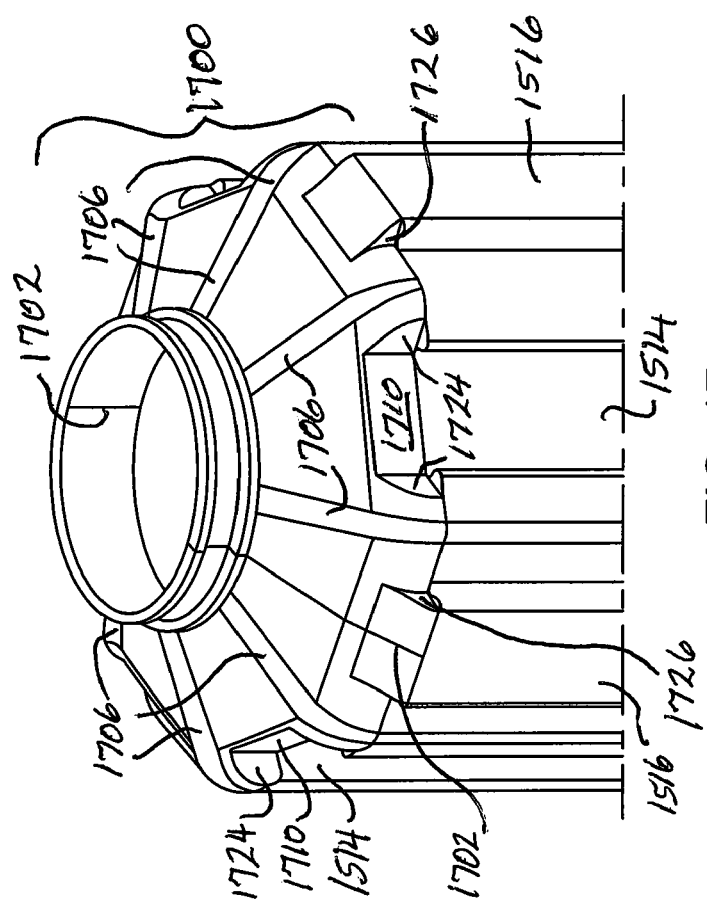
FIG. 17 is a more detailed isometric view of assembled shoulder section molds of FIGS. 15 and 16.

Referring additionally to FIG. 17 and FIG. 18, a more detailed view of mold body cavity top end sections 1500 and 1502 are shown in a closed position along mold edges 1504, 1506 creating mold line 1702, and will be hereinafter referred to as top end mold section 1700, while body section 1508 is also shown in a closed position with the top end section 1700. Top end section 1700 rises from the top of body section 1508 at mold line 1510 to its apex at the base of neck insert assembly line 1402, 1408 (hereinafter referred to as neck insert assembly 1704 in the closed position. In an exemplary embodiment, spines, or ridges, 1706 are distributed radially around top end section 1700 each beginning at the base of neck insert assembly 1704 and extending to or about a shoulder edge of top end section 1700. Spines 1706 may be distributed but radially from one another or in other configurations formed partially or fully on top end section 1700. In other embodiments, spines 1706 may be substituted with pegs or knobs on top end section 1700.

Top end section 1700 also includes a tongue transitional lead section 1708 transition section from a top of each tongue 1516 and to the sloped surface of top end section 1700. In the embodiment in FIG. 18, a base of tongue lead section 1708 has preferably similar dimensions as the top of each tongue 1516 and transitions at an angle towards top end section 1700. FIG. 17 and FIG. 18 further illustrate a top groove cap section 1710 with dimensions similar to groove section 1514 that provides a continuing open channel from each groove section 1514 to effectively extend through a shoulder edge of top end section 1700.

Connector tongue section 1516 comprises a raised, flat, or slightly rounded protrusion in body section 1508, providing a connecting mechanism to an article manufactured with groove 1514. As shown in more detail in FIG. 17 and FIG. 18, the connections provided for the articles comprise an interlocking mechanism using undercuts 1712, or dovetails, of each tongue 1516 that can be received into expanded undercuts 1714, or dovetails, of each groove section 1514. Undercuts 1712 are formed such that tongue section 1516 extends from body section 1508 with a narrower base than the width of tongue 1516 at its outermost portion. Each groove connector section 1514 is formed with undercuts 1714 such that the width 1716 of each groove indented into body section 1508 is wider than the width 1718 of the groove 1514. Tongue dovetails 1712 and groove dovetails 1714 are sized so that when two containers 100 manufactured from a mold of present embodiments, the containers 100 may be interconnected via longitudinal movement of sliding a tongue into a groove, where the width of the edges 1720 of a tongue slide laterally behind each undercut 1714. Once interlocked, the two containers cannot be easily separated or pulled apart horizontally but can be separated by sliding a tongue out of a groove longitudinally. While body section 1508 has at least one tongue 1516 or at least one groove 1514, embodiments can include more than one tongue 1516 and/or more than one on a single container body section 1508.

Providing tongue undercuts 1712 with interlockable groove undercuts 1714 creates difficult corners around which thermoplastic material must flow in the stretch molding process when manufacturing a container 100 with appropriate material. It is therefore preferable to have a mold cavity 1508 design with the least possible angled degree of undercuts or dovetails and yet still provide secure interconnectivity among containers 100. The resulting minimal undercut angles, in turn, require very tight precision in the shape and fit tolerances between tongue 1516 and groove 1514 connectors (more severe undercuts, if viable, would allow greater shape and fit tolerance between components of connected vessels). For the purpose of interconnectivity, an undercut angle 1712, 1714 between about 30° and about 75° is preferable to hold opposing container units 100 in a horizontally interlocking manner. However, these ranges are merely the preferred and undercut angles below and above this range and the dimensions stated below are within the scope of the claimed invention as long as two separate manufactured articles 100 with the interconnectivity mechanisms described herein can remain horizontally interconnected. In some embodiments, the groove-tongue assemblies are of modest size. In an exemplary embodiment, a tongue 1516 or groove 1514 is about 12 mm at their widest points; however this dimension is merely relative to the functionality of the interconnectivity requirements of the claimed invention. As will be appreciated by those skilled in the art, dimensions mentioned herein are relative and can vary depending on the size of a container, the cross-sectional shape of body section 1508, materials of manufacture, and other manufacturing or connectivity factors. The above factors result in a greater risk of groove-tongue disengagement as the undercut angles 1712, 1714 near an upper end (e.g., about 75°) of the aforementioned range, and especially where tongue-groove assemblies are of modest size. In contrast, the greater connectivity resulting as the undercut angle 1712, 1714 approaches the lower end (e.g., about 30°) of the aforementioned range renders molding and de-molding more difficult during manufacture. Thus, a tradeoff exists between the two aims of solidly holding undercuts on the one hand and easier molding/de-molding on the other. Further, the fit tolerance (or "air gap dimension") between grooves 1514 and tongues 1516 can range from about 0.05 mm to about 1.0 mm, depending largely on the severity of the undercut angles. For example, in one embodiment, the undercut angle 1714 is set at about 65 degrees with a fit tolerance or air gap dimension of about 0.05 mm.

Further, a difference in width of the narrowest tongue base section 1722 and a widest groove width section 1716 should allow a slidable connection to be maintained between two different exemplary containers 100 without a tongue 1516 being able to slip out of a groove 1514 if the two containers were pulled horizontally away from one another. The protrusion distance of tongue 1516 away from body section 1508 and likewise depth of groove 1514 indented into body section 1508 may vary but should not be so small as to prevent the interlocking of two similar containers 100 manufactured using mold cavity 1508.

As illustrated in FIGS. 15 and 16 and, with respect to container 100, FIG. 14, the mold cavity 1508 or 1410 can be considered as a sort of "cup" mold with an interior profile of alternating positive and negative dovetail shape "undercuts." A particular problem in the blow molding industry is to effect clean detachment of molds where undercuts in the product are desired. Most prior art employ cams or similar parts that insert and then retract to form and de-mold from the undercuts, usually limited in number. The unique and inventive process in the present case allows numerous undercuts, for example in an exemplary embodiment of an octagonal container 100 there are for example seventeen undercuts, two undercuts on each on each of four tongues resulting dovetailed tongues and two undercuts on each of four dovetailed grooves, in addition to one large undercut at the bottom end recession, which must be taken into account for removing a molded container 100 from body cavity 1508 with a single demolding motion.

However, the same multiple vertically aligned undercuts along the bottle sides achieved via a long-stroke cup mold 1508 in turn create a significant challenge for retractizng the remaining portions of the bottle 100. The upper portion of the bottle mold consists of two directly opposing mold halves 1500, 1502 that when joined at the top edge of the aforementioned cup mold form the bottle top end and an upward sloping rise 112 to the base of the bottle neck 110. In the absence of further process refinements, that pair of upper section mold halves 1500, 1502, when retracting, would catch on the upper reaches of the dovetailed undercuts 1712, 1714 formed in the top mold section 1706. Hence, as shown in FIG. 17, it is necessary to create along a perimeter line at or about the top end shoulder a series of chamfered cuts or notches 1726 at the top end of each vertical tongue and a series of chamfered cuts or notches 1724 at the top end of each groove. It is the combination of the reverse-logic "pull cup" mold piece and multi-chamfered shoulder mold pieces that allows (with another factors discussed throughout herein) the ISBM manufacture of bottles capable of modularly interconnecting both side-to-side and top-to-bottom.

Figure 23:
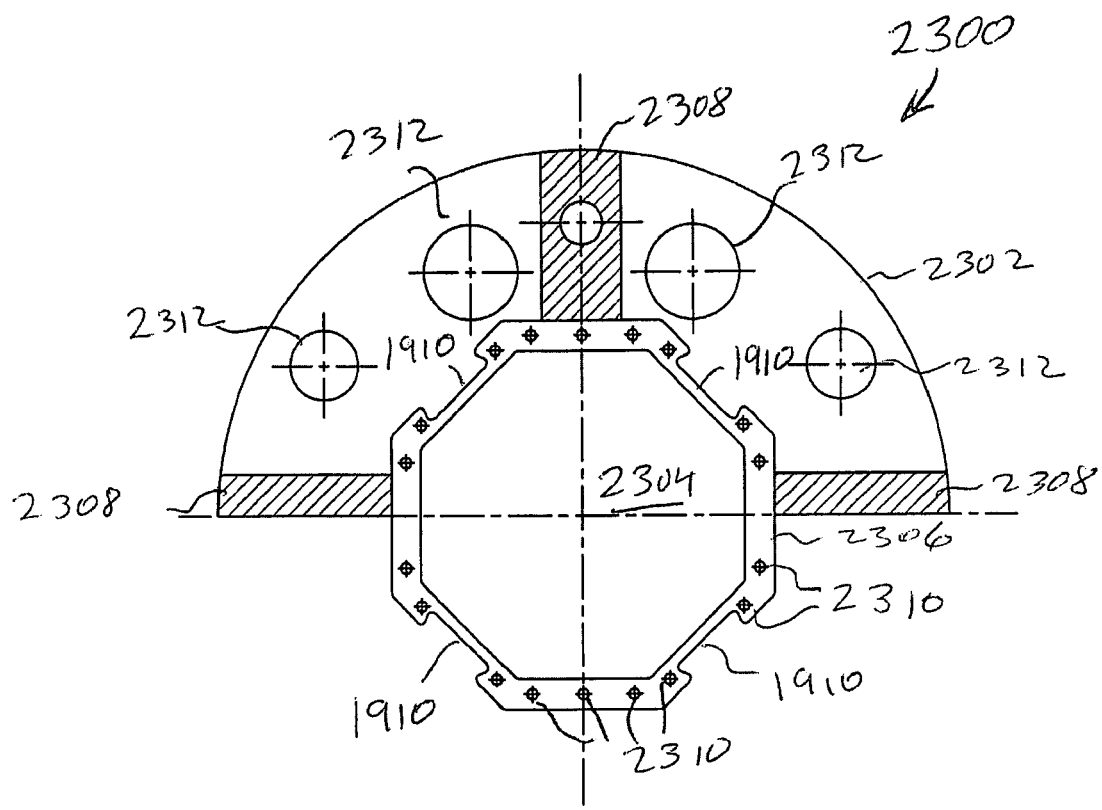
FIG. 23 is a cross sectional plan view of a half-section of a blow cavity bottom according to the embodiments.
Figure 24:
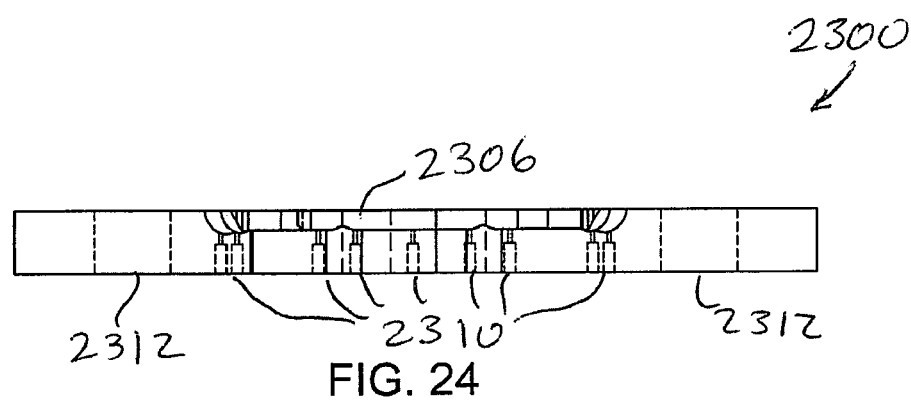
FIG. 24 is a cross-sectional side view of the blow cavity bottom in FIG. 23.
Figure 25:
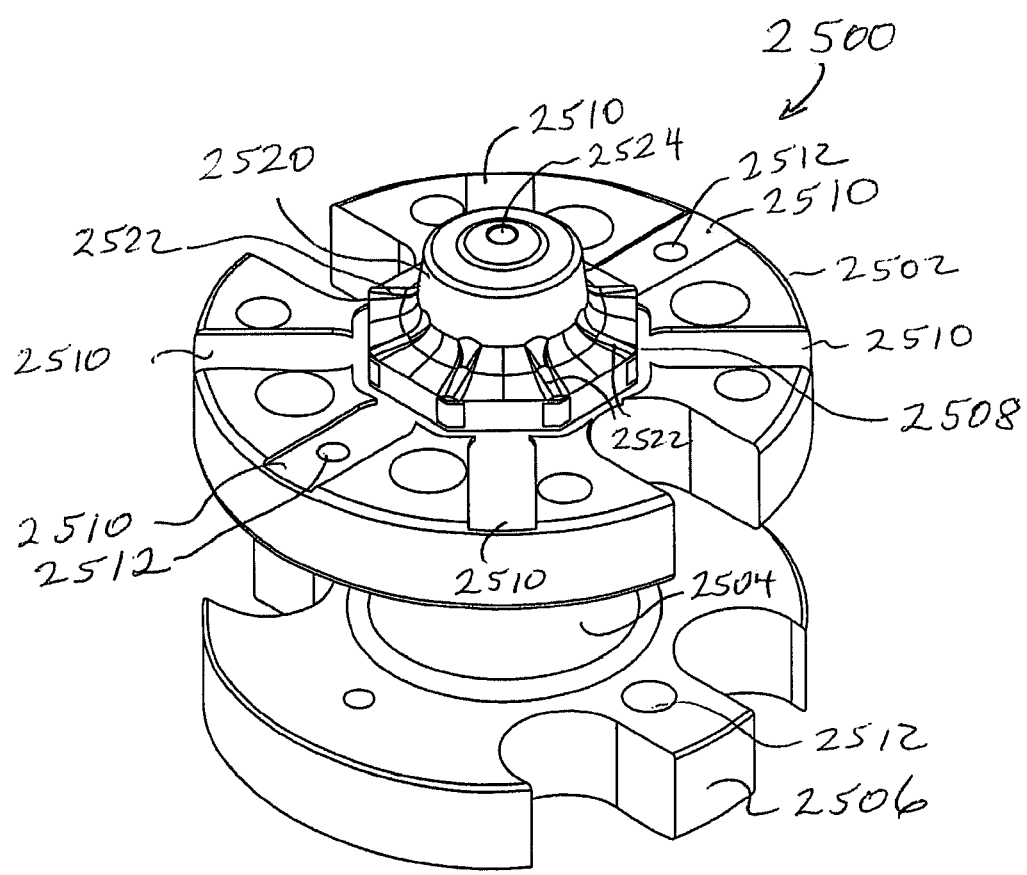
FIG. 25 is an isometric view of a bottom insert section according to the embodiments.
Figure 26:
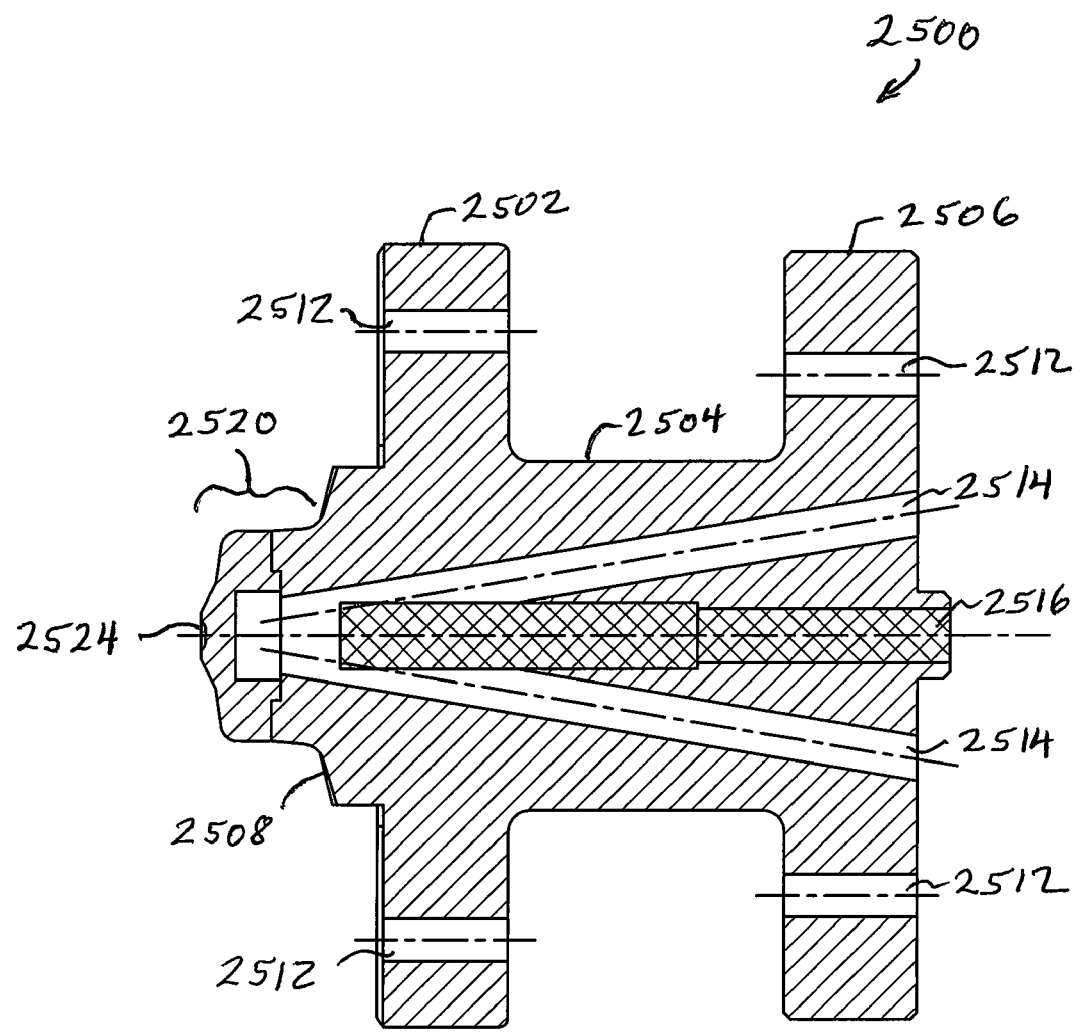
FIG. 26 is a cross-sectional side view of the bottom insert section in FIG. 25.
Figure 27:
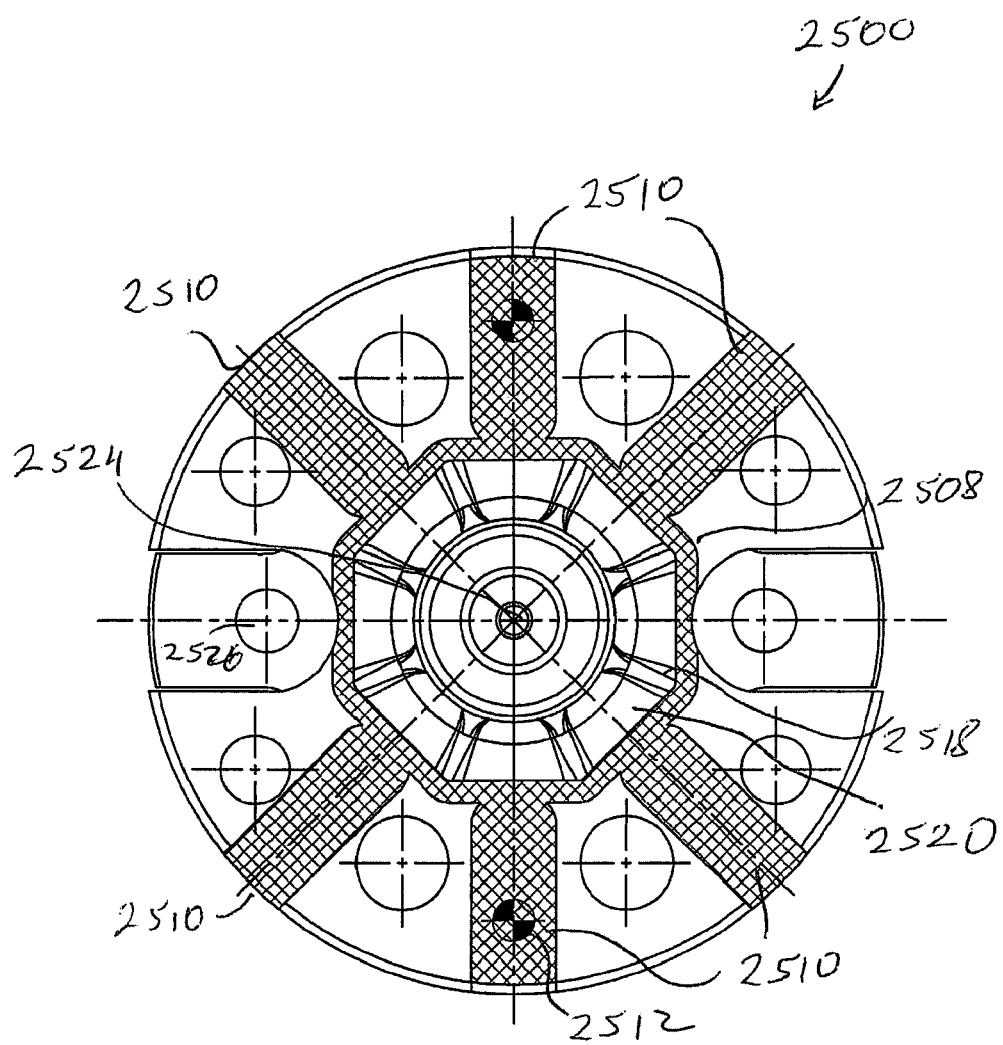
FIG. 27 is a cross-sectional plan view of the bottom insert section in FIG. 25.

A further desirable element is a top assembly slope 112 with enough pitch to accommodate liquid flow out of the container 100 and lend greater vertical strength. But that same degree of slope must be limited to ensure the least height reasonably possible for the fuller top section assembly 1700, which height a receiving bottom assembly must match. As the slope pitch increases, so does the difficulty of achieving sufficient PET resin flow to the bottom internal rim 2500 as illustrated in FIGS. 23-25 and described below during the blow molding stage. Yet another desirable aspect is to form reinforcing spines 1706 on the top end assembly (and corresponding grooves on a bottom assembly), on each surface lending strength and helping alignment, but creating additional demolding challenges.

Radial "spines" or ridges 1706, meant to lend additional strength to the top end assembly and, when in conjunction with corresponding grooves or channels on the corresponding bottom assembly, allow the user more easily to align the tongues and grooves of stacked bottles 100, 1000 and 1002 (see FIG. 10). For demolding purposes, the top end slope area spines 1706 are technically undercuts that normally would disallow or otherwise render very difficult the lateral demolding retraction of the top section opposing mold halves. Demolding process concerns therefore led to a design for spines 1706 with a graduated roll calculated to employ the spring back attributes of PET to allow the laterally retracting mold parts to slide over and/or temporarily push under the undercut ridges 1706.

The overlapping molding/demolding process challenges required further design elements in the mold cavities. The unique shapes of dovetails/undercuts on the tongues and grooves and their transitions, and the spine sections 1706 on the mold top section 1700 create other molding/demolding process challenges. The edges of the tongue and groove undercuts are slightly rounded, so as to facilitate resin flow into tight mold areas and alleviate mold release resistance (see FIG. 18). The bottom stretches of the dovetailed tongues 1516 terminate at about equal height to or higher than the total rise of the bottom assembly 400/2500, so as to lessen the total stretch blow distance and amount of resin and PSI blow pressure needed to reach and adequately treat the bottommost cavity zone, already a problematic area because of the difficulty of achieving resin flow over and around the steeply protruding bottom rise.

As illustrated in FIG. 18, dovetail cap relief areas are necessary in the design of the shoulder areas of the top end in order to allow top end mold sections 1500 and 1502 to move laterally to an open position after injection stretch blow molding a container 100 with the polygonal side walls as illustrated in the embodiments. Without cap relief areas 1724 and 1726, mold features on shoulder sections 1500, 1502 would resist against the hard edges of groove transitions 1710 and tongue transition 1708 when moving shoulder sections 1500 and 1502 to open positions, thus damaging container 100. Tongue transitions 1708 themselves are formed at a rounded sloped angle in order to remove any hard edges that could cause resistance to lateral movements of shoulder sections 1500 and 1502 during demolding processes.

In order to facilitate thermoplastic flow into mold cavity 1508 and also to ease de-molding, the design for tongue 1516 includes these sloped blendings, lead-ins or fade-outs to the tongues 1516 at the tongue transition section 1708 on shoulder section 1700 and optionally a similar transition area at base of tongue 1516 on body 1508. A challenge in forming the lead-ins/fade-outs is to determine the appropriate slope for such transitions, recognizing certain trade-offs related to the manufacturing of article container 100. The principal trade-off is that while more gradual slope angles suggest easier material flow and vessel de-molding, steeper slope angles preserve more functional tongue length for a greater span of interconnectivity with corresponding grooves 1514. With these factors in consideration, it has been determined that workable configurations in slope angles of tongue transition section 1708 range preferably from about 30 degrees to about 70 degrees; however, ranges could vary below or above these amounts and still stay within the scope of innovative design of the embodiments.

In certain embodiments, lateral interconnectivity provided in the preferred embodiment by tongues 1516 and grooves 1514 may be enabled by any of a number of molded hermaphroditic, longitudinally sliding connection mechanisms that are illustrated in FIG. 6 with respect to container or bottle interconnections (interlocks having an integrated groove and a tongue) present on each of the sides of the body section 1508. Alternatively, mold interlocks could be "hermaphroditic," meaning they possess both tongue and groove aspects in a single connector assembly. One skilled in the art will recognize that alternative embodiments of tongue 1516 and groove 1514 or the shape of the interlocks shown in FIG. 6 could be a design construction of any shape that allows for interlocking of the sides of the containers.

Figure 19:
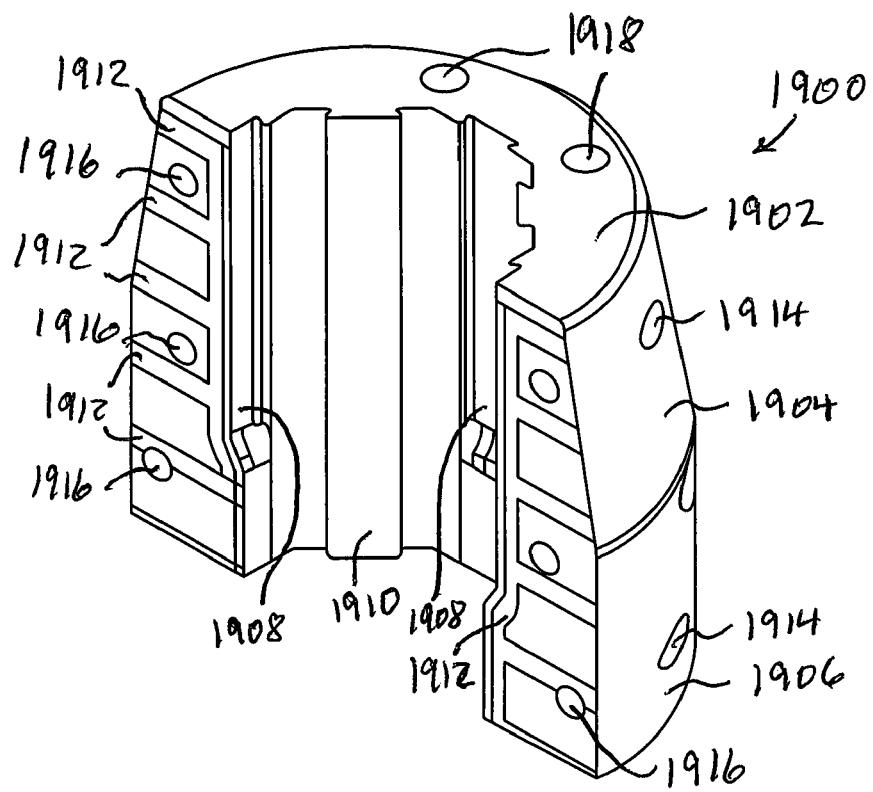
FIG. 19 is an isometric view of a blow cavity body mold half-section according to the embodiments.
Figure 20:
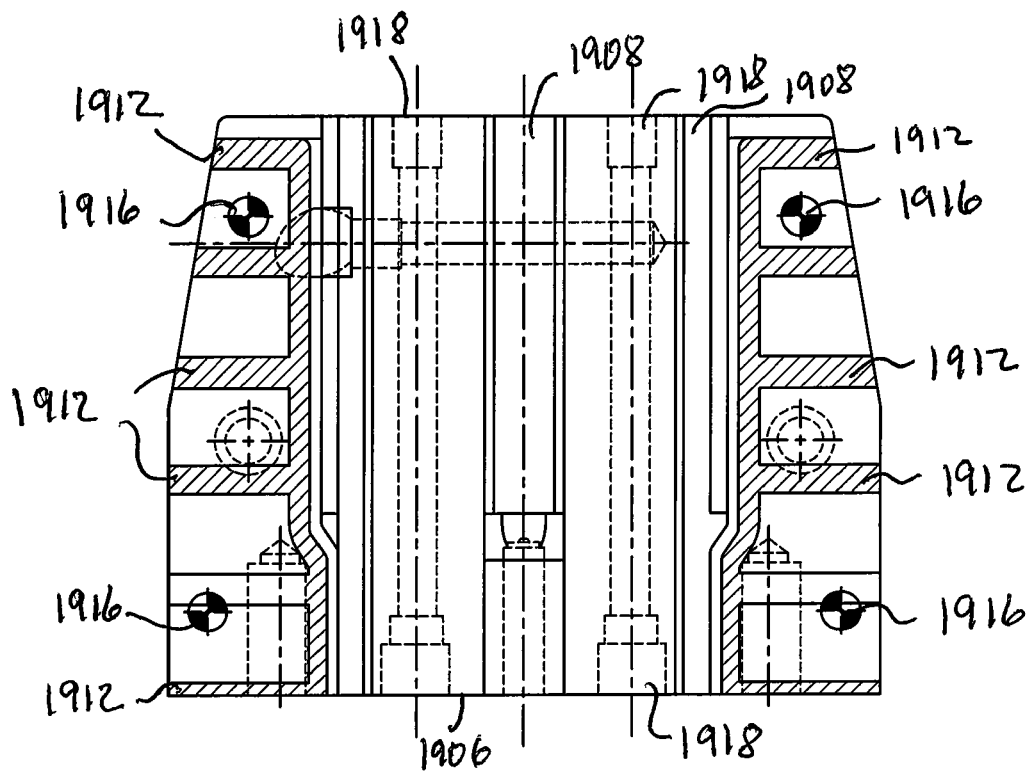
FIG. 20 is a cross sectional side view of the blow cavity body in FIG. 6.

FIGS. 19 through 28 illustrate additional embodiments of the mold cavity sections and manufacturing machines of the present invention. Mold body cavity members are preferably manufactured with stainless steel in order to better retain proper heat required to form a manufactured article 100, but as one skilled in the art knows could be manufactured with other materials known in the industry such as aluminum or iron. Referring to FIG. 19, a cut-away isometric view of a blow cavity body section half 1900 is illustrated and FIG. 20, a longitudinal cross-sectional view of the mold cavity of FIG. 19 is illustrated. Mold cavity 1900 comprises a cylindrical outer body, which is shown in a cut-away half-mold isometric view in FIG. 19. Blow cavity body 1900 also comprises a top section 1902, body section 1904, and bottom section 1906, when oriented as shown in the figures. Body section 1900 includes mold forms for tongue connectors 1908 and groove connectors 1910 according to the embodiments. Vent relief channels 1912 placed in various positions around body section 1900 provide escape paths for air trapped during stretch blowing operations, which escapes to ambient atmosphere through various vent relief outlets 1914. Heat exchange channels 1916 provide various pathways for controlling a temperature in body cavity body 1900 by circulating a fluid such as water or oil, chemicals, or air. While vent relief channels are designed near top 1902, bottom 1906, and mid-level sections 1904 of the body cavity body 1900, those skilled in the art will understand that other means of vent relief can separately or in combination be applied to vent air from within the body cavity, for example an air vacuum system could be employed for such a purpose. Pin support bushings 1918 are provided to retain pins (not shown) for supporting the body cavity 1900 for movement toward and away from support blocks or plates plate when the mold is opened and closed for replacement or maintenance and for securing the mold in place during operations.

Figure 21:
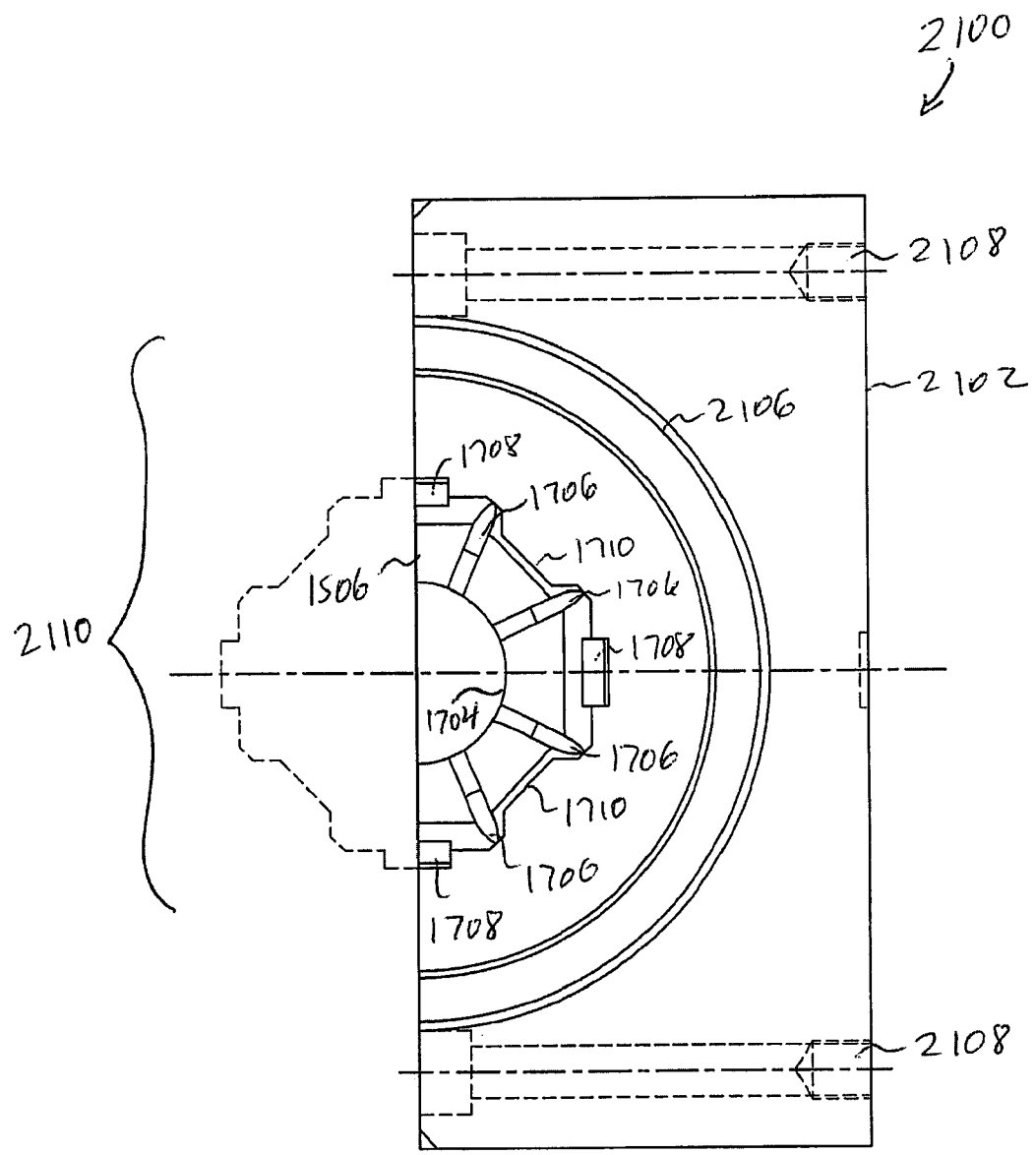
FIG. 21 is a cross sectional plan view of a half-section of a blow cavity top mold according to the embodiments.
Figure 22:
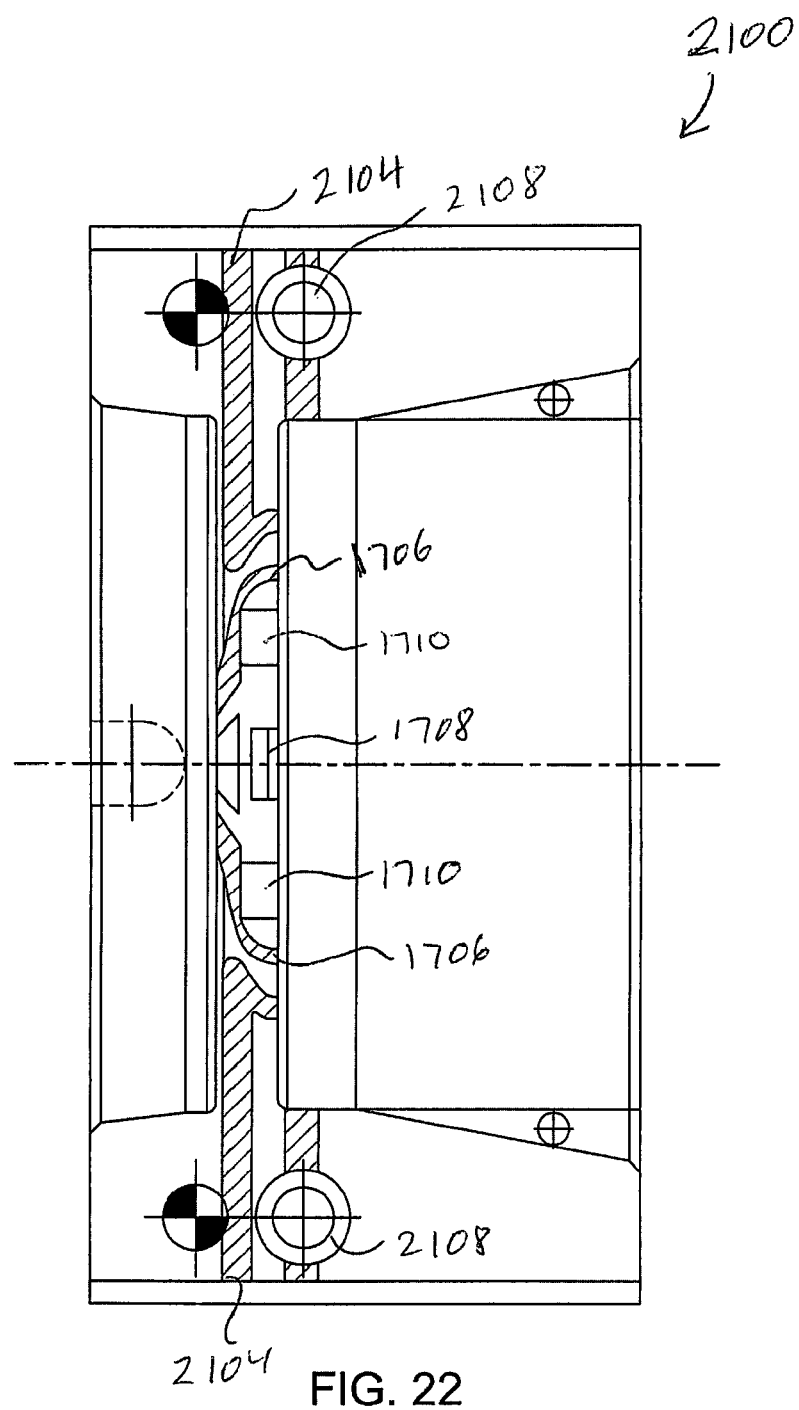
FIG. 22 is a cross-sectional side view of the blow cavity top in FIG. 21.

FIG. 21 and FIG. 22 illustrate side and top views, respectively of a blow cavity half top section 2100 which is a reverse view of one of mold top sections 1500 or 1502. Further details of contours or profile of the blow cavity top section 1902 are shown in FIG. 19. Blow cavity top 2100 comprises a housing 2102 which contains bushings for pins (not shown) that allow cavity top 2100 to slide horizontally into open and closed positions during blow molding operations. Vent relief channels 2104 are formed similar to vent relief channels of the embodiments. The base 2106 is formed in a circular pattern to fit securely against blow cavity body top 1902. Spines, or ridges, 1706 are distributed around sections 1502 extending from top shoulder mold edges to neck assembly 1704. Ghost lines 2110 illustrate an outline of a location of shoulder section 1500. Tongue section transition section 1708 and groove transition section 1710 are shown. Pins 2108 are secured through bushings in appropriate locations to secure top section.

Referring again to FIGS. 15 to 18, the contours or profile of a mold design to facilitate horizontal movement of shoulder sections 1500 and 1502 to an open position after stretch blow molding operations create a container 100. Each groove transition section 1710 has sides 1724 that are cut in an expanded V-shape to provide a groove transition 1710 width that is wider than the width of groove 1514. When top end section 1700 is placed onto body cavity body section 1516, the wide cuts 1724 expose a top portion of body section 1508 on either side of groove 1514, which portions are termed groove cap dovetail relief areas 1724. To create similar features for tongue cap transition 1708, the tongue is cut in a perpendicular manner resulting in tongue cap relief area 1726. Mounted onto body cavity body section 1508, a top portion of body section 1708 on either side of tongue 1516 is exposed as a flat surface area and groove cap dovetail relief areas 1724 are formed.

In another embodiment in FIG. 21, to further facilitate lateral movement of top section 2100 from a closed to an open position after a plastic container 100 has been molded, spines or ridges 1706 are formed to rise with a smooth arched or semi-circular pattern without hard edges. To remove a container 100 after formation, molding top sections 2100 must pull horizontally across the top of a formed container 100. For demolding purposes, spines 1706 are technically undercuts that normally would disallow or otherwise render very difficult the demolding retraction of top section 2100 without damaging or destroying container 100. Forming spine sections 1706 with a graduated or smoothed roll takes advantage of spring-back properties of the PET material of construction. Smooth roll-topped spines allow the laterally retracting top sections 2100 to slide over and/or temporarily deform spines created at the top of container 100, which sliding motion temporarily deforms container 100 downward without damage or permanent deformation as it flexes down and then back to molded shape.

FIGS. 23 and 24 illustrate an embodiment of a blow cavity bottom half section 2300, which when paired with a second similar half section, fits securely together to form a part of blow cavity body bottom 1906. Cavity bottom section 2300 includes a housing 2302 which, paired with a second identical housing (not shown), creates a center area 2304 within the bottom mold section. Various vent relief channels 2308 are located within housing 2302. Vent holes 2310 are distributed strategically around bottom mold section 2306. Vent holes 2310 provide escape routes for air to exit underneath mold sections 2308, 2510. Blow cavity bottom mold body 2306 is formed to create a bottom extension of core body 1900 including groove connector sections 1910. Corresponding tongue connector sections 1908 are not shown in bottom mold body 2306 because in the preferred embodiment the tongue sections 1908 do not extend the entire length to the lower area of the mold body cavity 1900, as is illustrated in FIG. 19. Various bushings 2312 provide housings for pins (not shown) which function to secure mold base 2300 to the core body 1900 and provide a means of disassembly.

An embodiment of a mold bottom insert section 2500 is illustrated in various views in FIGS. 25-28. Insert 2500 is designed to fit securely against blow cavity bottom 2300 such that the combination of mold sections creates blow cavity bottom section 1906, thereby sealing the bottom of mold cavity 1900. Insert section 2500 is used during stretch blow molding operations for creating a bottom end and vertical connecting mechanisms of an interlocking container article 100. Bottom insert 2500 comprises a cylindrical body with a middle area 2504 having a reduced diameter, affixed on top housing portion 2502 and base housing portion 2506. For the purposes of describing embodiments of the bottom insert section, unless otherwise specified, mold features are located on or within the top housing portion 2502. Housing 2502 further includes various vent relief channels which carry compressed air away from the lower internal area of mold cavity 1900 during molding operation. Bushings 2512 in top 2502 and lower sections 2506 are formed to receive pins (not shown) in order to secure bottom insert 2500 to mold cavity 1900 and an external frame in a molding machine.

In FIGS. 8, 15, and 17, the angle of slope 808 of top end section 1700 to neck base 1704 determines a height of the top end section 1700 from mold line 1510. It also serves to define a vertical connecting mechanism for top end section 200 to abut rise 812 at angle 814 leading to vertical interconnection receptor 402 from a similar container 100. As illustrated in FIG. 8, cavity rise angle 814 should match the top end slope angle 808 so that receptor slope 812 of one container 100 will seat evenly against top end slope 810 of a second container 100' thereby enhancing vertical interconnectivity and stability. One design element to account for is that the higher the rise of these components from horizontal, the more difficult the flow of thermoplastic material into the bottom-most extremities during the molding process. Thus, the angle 808 of the top end slope 810 is no steeper than minimally necessary: (a) to allow proper flow of thermoplastic materials to the outer edge of top end sections or assembly 200, and to the bottom end section 400 of a container during the molding process; (b) to provide adequate compressive strength and transfer of vertical force; and (c) to allow proper flow of liquid or pourable (e.g., granular or powdered) solids out of the finished vessel. A likely functional range of top and bottom end slope angles is determined to be between about 1:4 and about 1:1 (otherwise expressed to be between about 11 degrees and about 45 degrees). However, these ranges are merely exemplary and actual ranges could vary higher or lower without deviating from the scope of the claimed invention. In certain embodiments, the slope is selected to be about 1:3 or about 15 degrees. This value is intended to deliver considerable compressive strength (further enhanced by spine ridges 116) while facilitating adequate flow of thermoplastic molding material into the shoulder turn area 112 of top end section 200 as well as adequate flow of liquid or pourable solids out of the finished container 100. Bottom insert mold section 2500 creates the incline 812 in a molded container 100.

Bottom insert section 2500 includes bottom insert mold 2508 that is shaped in the preferred embodiment as an octagon, however as stated previously one skilled in the art will recognize that other polygonal, circular, or irregular shaped molded articles with a mold body and bottom insert shaped accordingly. Insert 2500 can be aligned with and is received by into center space 2304 of blow cavity bottom 2300. In order to create a plurality of plastic containers similar to container 100 that can be stacked vertically on top of one another, the slope of bottom insert mold incline section 2508 rises at an angle similar to the sloped angle for top end sections 1700. Connection channels 406 are created by channel connection sections 2522 indented into rising sloped section 2508 and are sized and designed such that container 100 can stack onto a second container where channels 406 of the first container 100 receive the spines or ridges 116 from the top of the second container.

At its center, bottom insert mold 2500 includes a receptor section 2520 that is a diameter and height that approximately corresponds to a diameter and height of a neck with a cap on bottle 100 and that is manufactured according to the present embodiments. In the preferred embodiment, receptor section 2520 has a circular footprint and includes approximately perpendicular walls rising from insert mold section 2508.

Height of receptor mold section 2520 above incline base 2508 is a design factor in the present embodiments. Bottom stretches of tongue mold sections 1908 terminate approximately at a height of or higher than the highest point in the rise of bottom insert section pushup 2500. Receptor section 2520 should be of such a height not to encumber plastic flowing in body cavity body section 1900 during blow molding, by minimizing the total stretch blow distance and volume of plastic and blow pressure needed to adequately move the hot plastic into the lowermost body cavity area.

An issue related to receptor mold section 2520 is the need to account for an irregular piece of hanging plastic "dimple" that is ubiquitously formed at the base of stretch blow molded bottles as a result of the stretch rod centering and "pinning" an elongated preform (and its leading "gate") against a flat surface of receptor section 2520. This blow process may also cause irregular flow of plastic at the base of the mold cavity during the molding process. For example, plastic could pool on a top surface of receptor section 2520 if the surface were flat. A bottom receptor 402 formed as on a container 100 using ISBM leaves a hanging dimple centered at the bottle's base 402, which dimple would substantially reduce or preclude an ability to create a stable vertical interlock on a vertically inserted capped similar bottle 100, and prevent proper seating, thus precluding a proper top-to-bottom vertical fit between two bottles. To resolve this issue a convex dome 2524 is formed on a top surface of receptor section 2520 to be the highest point of the bottom insert 2500. Dome 2524 has a diameter somewhat less than a diameter of the entire cylindrical push-up insert section 2520. The convex nature of dome 2524 allows plastic to flow relatively evenly over push-up insert 2500 without pooling on top of a receptor section 2520 flat surface, thereby alleviating irregular plastic flow issues.

Figure 28:
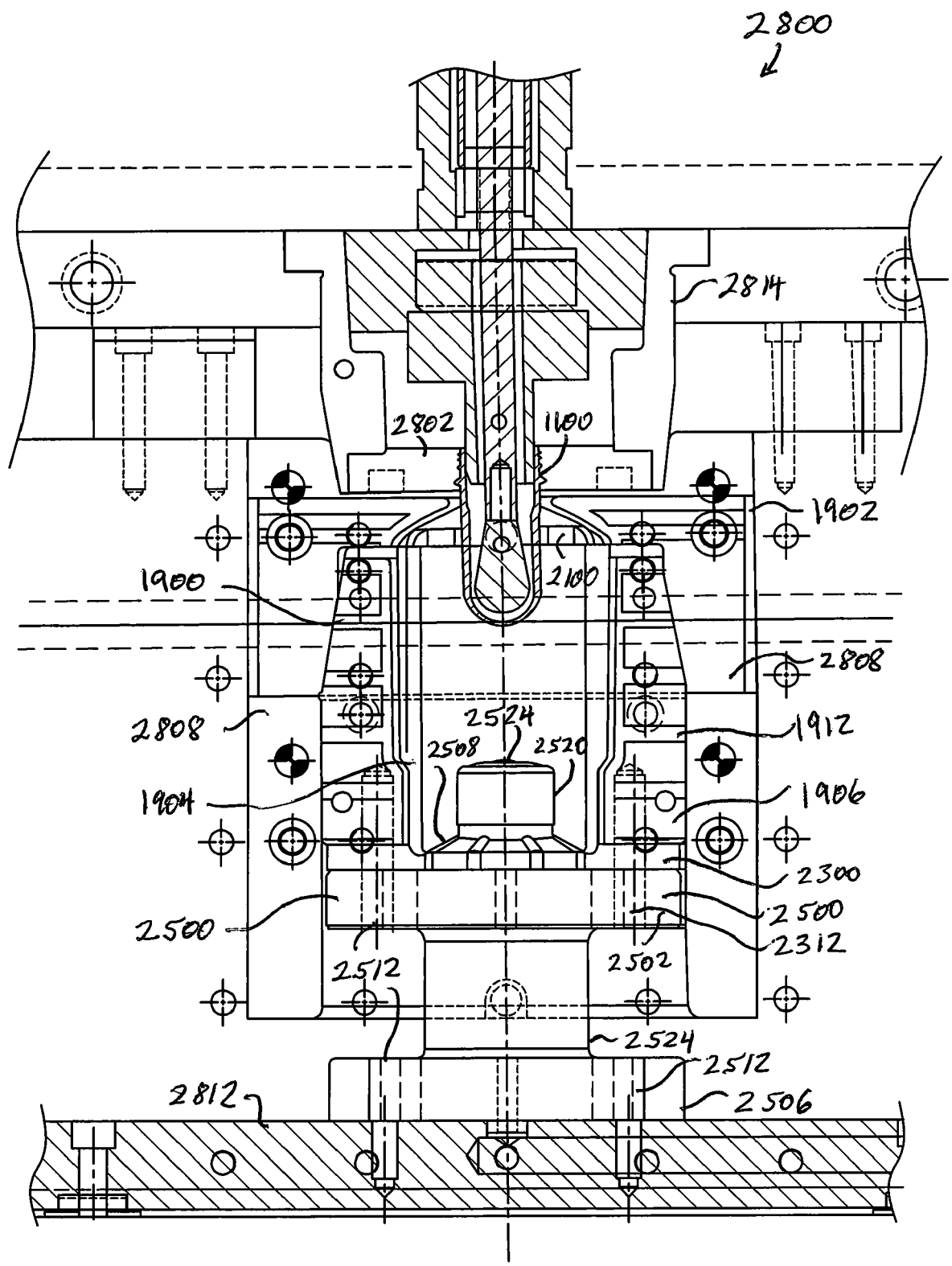
FIG. 28 is a cross-sectional side view of a blow station assembly according to the embodiments.

FIG. 28 illustrates an embodiment of a blow station assembly 2800 that includes blow cavity body 1900 assembled to blow cavity top 1902, blow cavity bottom 1906, blow cavity bottom insert and 2500 and bottom section 2300, which are housed within with a blow cavity nest 2808. An insert 2802 which holds threaded neck sections 1104 of a preform mounts to blow cavity top 1902. Base insert section 2500 is held in place by being secured to a mounting plate 2812. Housing support 2814 provides additional structural support. During operation, stretch rod 2804 lowers stretch rod tip 2806 which stretches a preform 1100 into blow cavity body 1904 while compressed air is blow into preform 1100 to complete a stretch blow of preform 1100 into a finished article 100.

The "one-step" blow molding machines presently adaptable for purposes of manufacturing the bottles herein described share certain limiting characteristics that call for inventive processes to overcome. However, the present state of the art for one-stage machines is such that the passage through the manifold results in some unevenness of temperature of the PET as it arrives at the perform injection molding station. That minor temperature unevenness persists through the rest of the blow molding cycle, but is a negligible factor in achieving the desired features of virtually any PET bottle other than the vessel(s) described herein.

In the present case, uneven temperature, although slight, raises a major manufacturing hurdle, because the very complex design of the desired product (as FIGS. 1-5 show) demands very precise heat and air blow symmetry, far more than for typical PET bottles. Reworking the manifold, even if technologically viable, would prove quite expensive. Overcoming the detrimental, here even disabling, effects of uneven temperature requires a coordinated sequence of countering steps, such orchestration not employed elsewhere in ISBM manufacturing.

As mentioned previously, the desire for high volume production limits the range of blow molding machine type and manufacturing techniques. In that vein, in order to minimize per-unit production costs, and to facilitate technology transfer, it is preferred to resort to existing blow molding machine models (some modifications thereto are necessary). The machine type and manufacturing techniques are also limited by the intent to produce bottles with differing volume capacities but the identical footprint and undercut pattern, so as to allow full interlocking among the various sized bottles.

The resin materials used in the stretch blow molding process also affects process requirements. The preferred use of PET material requires the selection of a PET formula with the IV (intrinsic viscosity) rating most likely to deliver the balance of malleability and strength needed for the complex bottle design and processes contemplated. As an overarching conceptual and practical matter, manufacturing the family of vessels of 250 mL, 375 mL, and 500 mL, as exemplified in FIG. 10 presents the dual challenge of (a) getting sufficient flow into the undercuts, bottom insert connections, and tight corners and bends of a complex mold, and (b) getting that same complex mold off the blown vessel despite the numerous undercuts running in different directions. More specifically, as to the series of undercuts necessary to create snug side-to-side connectivity via dovetailed tongues and grooves, the process considerations include (a) limits to the possible extent of dovetailed undercut because of difficulties achieving sufficient resin flow and then clean demolding, (b) relatedly, limits to the sharpness of the extreme edges of the dovetailed elements because of difficulties achieving sufficient resin flow and then clean demolding, (c) limits to the size of dovetailed elements because the desired container "footprint" has a limited diameter/circumference, and (d) relatedly, limits to the size of dovetailed elements because several sets of connecters on each bottle are preferable. As to the undercuts to achieve a snug top-bottom connection, the process considerations include (1) the need for a straight-sided rise in the neck-receiving portion of the bottom assembly, and (2) relatedly, in the blow molding stage, the need for significant air pressure flow toward the bottom outside edges of the mold and then back toward the center of the bottom assembly insert 2300, requiring an appropriately elevated PSI measure.

Previous mold designs and manufacturing processes are inadequate for producing an article with the interconnectivity and bottle design features of the present embodiments as described herein. Further machine-specific requirements allowing the present process invention are (1) the ability to employ directly opposing mold parts (as opposed to hinged "clamshell" mold parts) in the upper section of the mold, (2) the availability of vertical zone heating of the parison at a pre-blow conditioning station, and (3) the ability at the blow stage to employ variable PSI levels, including high-range blow force without damage or destruction to the bottom of the container.

After preform production in a stretch blow molding machine, the preform travels to a blow station, where the final bottle shape is achieved via stretch blow molding into the mold cavity. The bottle mold invariably is constructed of multiple moving parts. Usually it consists of three main pieces, i.e., a pair of opposing or hinged sections which encompass nearly the full height and surface area of the vessel, and a much smaller and shorter base section sealing the bottom of the mold, all three retracting after the blow cycle completes so as to help release the finished bottle. The "stroke length" controlling the movement of the smaller bottom mold section is normally brief, just enough to gain clearance for bottle ejection. One technical problem to overcome is vertically demolding a formed article after blowing in a solid body cavity section body mold instead of a clamshell design. In one embodiment, a mold with straight, or vertical, walls in the body cavity body section is required to form a container with undercuts. A longitudinal wall or walls of the body section are formed as perpendicular or nearly perpendicular to a flat base, or in other words parallel with one another such that one side of a container formed by the mold can connecting laterally with a side of a similar container.

The present embodiments present a radical departure in molding logic and mold section movement, including in the primacy and relative stroke lengths of the various mold components. Here, the base section of the mold comprises the majority (more than 80%) of container surface area. The much greater than normal height of the base section in turn requires a blow machine capable of a bottom demolding stroke slightly longer than the height of the bottle to its shoulder turn. Because the invention contemplates the ability to produce containers of varying volumetric capacity but the same footprint, requiring therefore differing container heights, the blow molding process employed must accommodate a variety of bottom stroke lengths, with each increase in volumetric capacity demanding a correspondingly longer stroke. For example, in various embodiments, a 250 mL or 8 oz container requires about a five inch stroke, while a 375 mL or 12 oz vessels needs a seven inch stroke, and a 500 mL or 16 oz container about nine inches. Changes to molding machine stroke length may also require adjustments to the controlling software.

In forming a plastic article as described in the present invention, a number of devices and processes traditionally used for stretch blow molding manufacturing were shown to be inadequate. The various embodiments are described herein which overcame these inadequacies. In some embodiments, the apparatus and processes pertaining thereto are aimed at providing adequate materials flow into groove and tongue dovetails while preventing damage or destruction of the bottom end of a container during the blow molding operation. The bottom end section is indented with radially distributed channels which extend from the container edge to an edge of a bottom interconnection receptor. Channels are arranged to receive radially distributed ridges or spines formed on a container top end section. Bottom interconnection receptor 402 is formed to receive a cap secured onto on neck threads of a similar bottle, thereby creating vertical interconnection.

In an embodiment a process engaged to form a 250 mL bottle according to the apparatus and techniques of the present embodiments. Preform 1100 with a gram weight of 10.9 and formed by injection molding of PET with an IV rating of 8.0 in a one-step stretch blow-molding machine was inserted into mold body cavity and held by shoulder mold sections. Using a base insert 2520 of 10 mm height from the bottom and shoulder and bottom shoulder angle of 30 degrees, at a blow pressure of 400 psi or more and preform temperature of approximately 275 degrees, the bottom area of a molded container became either deformed from insufficient flow into the side dovetail undercuts and the bottom area of the mold cavity, or damaged and blown apart. The first compensatory step was to design and create at the preform stage a uniquely profiled parison of heavier weight such as 22 g, and considerably more weighted at the bottom of the closed area than normal parison of consistent wall thickness. In order to deliver sufficient resin to the large surface area the bottle bottom, assembly 2800 is maintained at a higher-than-normal internal temperature by means of heated fluid in the hollow core of the perform insertion rod. However, the base area of the container continued to be damaged or blown apart.

In one embodiment, to overcome the problems of base area blowout, height of base insert receptor section 2520 was reduced and a pre-blow regulator valve (not shown) and stretch rod timer (not shown) were installed to operation in conjunction with the ISBM assembly 2800. A pre-blow regulator initiates compressed air blowing at around 100 PSI into the preform before a final stretch and high pressure blowing. The process of pre-blowing into a flatter bottomed mold prevented blowout at the base area.

The several challenges in attaining sufficient resin flow to uniquely tight and distant corners and undercuts demand a number of further machine and mold innovations applied in coordinated fashion. One such adaptation is to conduct the actual blow process in two sub-stages. The first, at approximately 100 PSI, positions the partly expanded parison quite close to the mold walls with little to none of the immediate loss of heat that occurs when resin contacts cavity walls. Here, it is necessary to design special stretch rods and tips adequate to the particular tasks and conditions. The second blow sub-stage is a blast of air at around 500 PSI, with the unusually high pressure necessary to force resin into undercuts, tight corners, and "back" against the bottom rise before extended contact with the mold cavity cools the resin to the point of retarding its further flow.

Other elements of the mold shape are designed to overcome process challenges. During further processing of forming molded containers of the embodiments, a height restriction of the base insert 2520 was determined. When base insert receptor section 2520 was raised to 4 mm and shoulder and base should sections at 30 degrees slope, the base area of a bottle was again damaged or blown apart. The verticality of the neck and cap receiving portion of the bottom protrusion is necessary to achieve a snug top-to-bottom fit between two stacked bottles. A resulting process difficulty is to direct enough blow pressure back toward the center pole 2520, which is not a consideration with typical ISBM created containers, where the blow pressure need only flow downward and outward.

The degree of slope on the top assembly presents some important tradeoffs. Resin flow into the mold extremities of the top end and liquid flow out of the finished bottles would each be facilitated by a steeper slope, and bottle vertical strength for top bottom stacking would increase. Countering those considerations is the need to achieve a relatively low profile for the entire top assembly, so as to minimize the height of the corresponding bottom section recession or rise, which height creates significant problems for achieving adequate resin flow into the bottom corners of the blown bottle. To prevent further base area blowouts in the base area, the profile of the top end assembly and base insert was changed, striking a viable balance among such tradeoffs; one embodiment of the blow molding process sets the slope of base insert, and therefore top end section slopes, at about 15 degrees.

In order to prolong the opportunity for sufficient resin flow into distant and tight zones, the mold pieces are constructed of steel, instead of the far more typical, and quicker cooling, aluminum molds for PET container manufacture. Moreover, pathways for heated water or oil are channeled at several mold locations in order to modulate temperatures on the internal cavity surfaces and, accordingly, the pace of resin flow and cooling. Further, exhaust vents are located at the furthest lower reaches of the mold cavity, so as to minimize flow resistance into those zones. Creating the molds with steel instead of aluminum also yields a harder surface for purposes of reducing demolding resistance and "scratching" or "scratch marks" during the mold sections retraction stage, of particular importance where the intended product has undercuts and/or other complex aspects. The special steel molds are also amenable to a coating that assists in removal of a molded article.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A method for forming a molded article, comprising:
   providing a cup mold with an undercut on a vertical wall;
   providing a top end mold assembly;
   placing a preform in a mold cavity created by the cup mold and the top end mold assembly;
   blowing air into the preform to form the molded article within the mold cavity;
   removing trapped air in the mold cavity through vent relief channels placed in various positions around the cup mold that extend from an interior of the mold cavity to ambient atmosphere; and
   demolding the molded article using countercuts around the top end mold assembly and moving top end mold sections of the top end mold assembly away from each other and by removing the molded article vertically from the cup mold;
   wherein the countercuts are formed by locating a vertical parting line between the top end mold sections of the top end mold assembly at the exact center of two opposing tongues, and above a horizontal mold line between the cup mold and the top end mold assembly.

2. The method of claim 1, wherein the blowing step comprises forming the molded article with one or more untapered, perpendicular walls.

3. The method of claim 1, wherein the blowing step comprises forming undercuts on a tongue of the molded article.

4. The method of claim 1, wherein the method for forming an article further comprises moving the top end mold sections of the top end mold assembly between opposing open and closed positions.

5. The method of claim 1, wherein blowing air further comprises performing a pre-blow process at a first predetermined pressure that partly expands the preform.

* * * * *